United States Patent [19]

Baugh et al.

[11] 4,237,847

[45] Dec. 9, 1980

[54] COMPOSITE ENGINE BLOCK HAVING HIGH STRENGTH TO WEIGHT RATIO

[75] Inventors: James D. Baugh, Greensburgh; Stephen Smith; Terrence M. Shaw, both of Columbus, all of Ind.

[73] Assignee: Cummins Engine Company, Inc., Columbus, Ind.

[21] Appl. No.: 22,647

[22] Filed: Mar. 21, 1979

[51] Int. Cl.³ .......................... F02F 7/00; F16M 1/02

[52] U.S. Cl. .......................... 123/195 R; 123/41.72; 123/193 C

[58] Field of Search ........ 123/195 R, 193 C, 193 CH, 123/52 MC, 59 R, 41.72, 41.83, 41.84, 196 M, 41.28; 92/147

[56] References Cited

U.S. PATENT DOCUMENTS

| | | | |
|---|---|---|---|
| 2,129,906 | 9/1938 | Brill . | |
| 2,681,054 | 6/1954 | Boghossian . | |
| 2,793,625 | 5/1957 | Kolbe | 123/195 R X |
| 2,996,050 | 8/1961 | Caris | 123/195 R |
| 3,046,952 | 7/1962 | Dolza . | |
| 3,110,293 | 11/1963 | Reiners | 123/195 R X |
| 3,351,044 | 11/1967 | Pomeroy . | |
| 3,882,842 | 5/1975 | Bailey et al. | |
| 3,895,868 | 7/1975 | Castarede | 123/195 R |
| 3,991,735 | 11/1976 | Horstmann | 123/195 R X |
| 4,059,085 | 11/1977 | Mansfield et al. | |

FOREIGN PATENT DOCUMENTS 615045 12/1948 United Kingdom .

*Primary Examiner*—William D. Martin, Jr.

*Attorney, Agent, or Firm*—Sixbey, Friedman & Leedom

[57] ABSTRACT

A composite engine block is disclosed including a main frame containing plural cylinder liner receiving cavities interleaved with plural cross walls extending generally perpendicularly between the outer side walls of the main frame and an oil pan adapter or ladder frame forming the lower section of the composite engine block between the main frame and the engine oil pan. Each main frame cross wall is combined with a pair of pillars extending between the upper head engaging surface of the main frame and a crankshaft bearing support located adjacent the lower surface of the engine block, wherein both the cross wall and pillars are shaped to strengthen and rigidify the composite engine block and to facilitate metal casting of the main frame. Size and weight reductions are realized by engine coolant flow paths within the main frame which bring coolant into contact with only the upper portion of each cylinder liner and lubrication flow paths in the main frame which cause the engine lubricant to return from the camshaft to the engine oil pan along a path which includes the space between the lower portions of the respective cylinder liners. Lubrication is supplied to corresponding main and camshaft bearings along single linear supply branches which intersect with a main lubrication rifle arranged parallel to and intermediate the rotational axes of the engine crankshaft and camshaft.

64 Claims, 21 Drawing Figures

FIG. 10
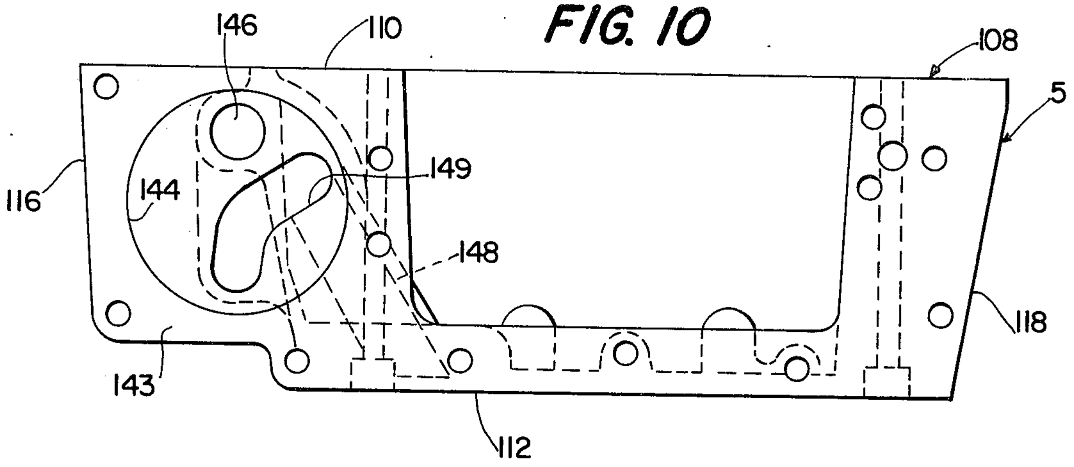
FIG. 11
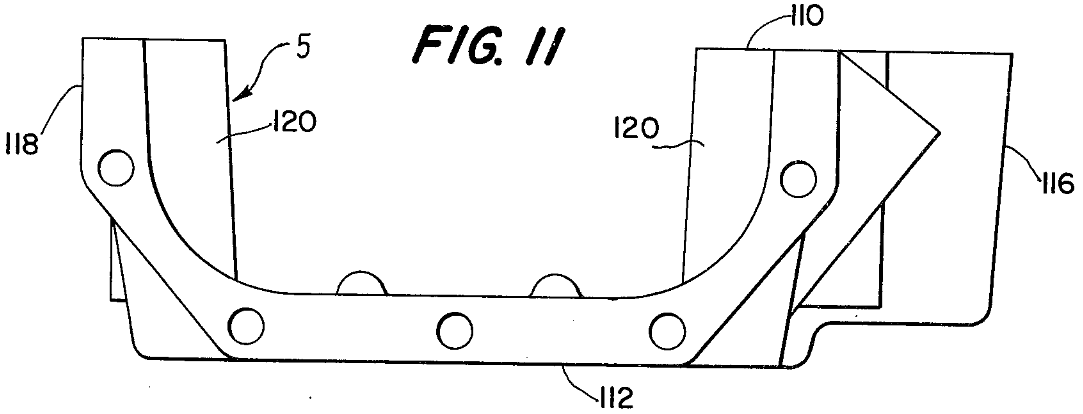
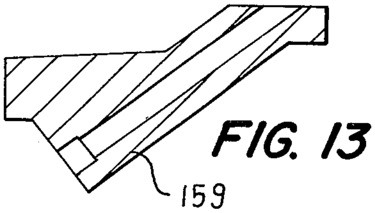
FIG. 13
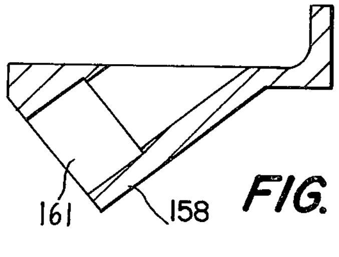
FIG. 14
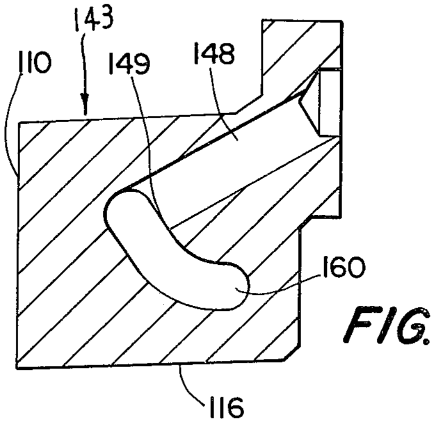
FIG. 15
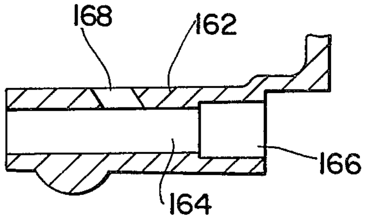
FIG. 16

COMPOSITE ENGINE BLOCK HAVING HIGH STRENGTH TO WEIGHT RATIO

TECHNICAL FIELD

This invention relates to engine block designs for internal combustion engines. More particularly, this invention relates to a composite engine block for a compression ignition engine wherein each component part of the block is configured to maximize its own strength to weight ratio while cooperating with the configuration of the other components in a way to synergistically increase the strength to weight ratio of the composite block. The disclosed invention is further concerned with the technology of mechanical vibration reduction in the operation of internal combustion engines.

BACKGROUND ART

Greater fuel efficiency and lower operating noise have traditionally been important objectives in the design of internal combustion engines, but the rising cost of fossil fuel and increasing concern over noise pollution has greatly intensified the need to achieve higher levels of performance in these areas. One fundamental approach for improving strength to weight ratio has been to provide specialized load bearing structure within the engine block to enable the engine block to better withstand concentrated loads without substantially increasing the overall weight of the block. For example, U.S. Pat. No. 3,046,952 to Dolza discloses a light weight engine block wherein elongated steel bolts extending through the block are each connected at one end to the engine head and at the other end to a respective main bearing cap. In addition to increased assembly and manufacturing costs, the use of such elongated bolts requires an overall increase in the size of the engine block by necessitating increased spacing between cylinder cavities. This increased spacing is required, in part, because the bolts are under tension at all times and the block must accordingly be strengthened in the vicinity of the bolts to withstand the bolt tension. One proposed solution to this problem illustrated in U.S. Pat. No. 4,059,085 to Mansfield et al has been to provide an internal combustion structure in which the cylinder head and main bearing caps are linked by a framework of members including pairs of tension members. While useful in some circumstances, the disclosed framework includes members angled obliquely to the direct line between head and caps which unduly enlarges the overall engine size.

A variety of composite engine block designs have also been proposed in attempts to optimize the often conflicting goals of high strength, low cost and compact size. For instance, U.S. Pat. No. 3,351,044 to Pomeroy discloses an internal combustion engine including an upper unit containing plural cylinder cavities and a lower unit containing a crankshaft to which the engine oil pan is attached on the lower side. While some advantages may be achieved with this design, such as facilitating engine assembly, no strength improving advantages are disclosed by the use of this composite design. The Pomeroy patent also discloses a pair of bolt-on water jackets for use on the respective sides of the upper unit thereby achieving a streamlined outer engine configuration and simplified coolant system. However, this patent fails to suggest any way in which the advantages of such a bolt on jacket can be used while simultaneously reducing the number of component parts and avoiding at least some of the increased seal leakage potential which naturally attends the use of two separate bolt on water jackets.

The use of cylinder liners in internal combustion engines has long been recognized as desirable as a means for improving internal combustion engine design and is especially desirable because it allows greatly simplified engine overhaul. One particularly desirable liner design is disclosed in British Pat. No. 615,045, accepted Dec. 31, 1948, wherein the liner is provided with an exterior stop positioned intermediate the ends of the liner for engagement with a liner stop located within the cylinder cavity at a substantial distance from the head engaging surface of the engine block. This design affords numerous advantages over liner designs employing a liner stop located at the top of the liner by allowing, for example, improved head gasket sealing during engine operation. The provision of mid stop liners, however, creates complications in routing the coolant and lubrication fluid flow passages through the engine without substantially increasing the size or complexity of the engine block design. U.S. Pat. No. 2,681,054 to Boghassian discloses an integral cast block for receiving mid stop cylinder liners wherein the camshaft and crankshaft bearing supports are cast integrally within the block. However, no portion of the space between the cylinder liners is utilized for the lubrication fluid return flow passage requiring other portions of the engine block to provide this function. Provision of an integral oil gallery within the disclosed engine block design of the Boghassian patent permits supply of lubrication fluid to both the crankshaft and camshaft bearing supports through passageways integral with the engine block but plural angularly arranged passageways are required for each set of interlinked crankshaft and camshaft bearing supports.

A great variety of engine block designs are known which employ cross walls extending between the cylinder cavities of the engine to provide support to the outer side walls of the engine block. One example of such a cross wall design is disclosed in U.S. Pat. No. 2,129,906 wherein a large aperture is provided in the cross wall as illustrated in the drawings of this patent. While such a cross wall design will reduce engine weight as compared with solid cross wall designs, there is no disclosure in this patent which would suggest how a cross wall design of the type illustrated could be used to provide sufficient strength to the liner stops within the engine block. In short, the prior art of engine block design is devoid of an optimum engine design which simultaneously provides high strength, low cost and compact size.

DISCLOSURE OF THE INVENTION

The basic object of this invention is to overcome the disadvantages of the prior art as listed above and, in particular, to provide an engine block design characterized by light weight, compact size and high strength as well as low operating noise characteristics.

A more specific object of this invention is to provide a composite engine block structure wherein each component is designed for maximum strength to weight ratio taken by itself as well as being designed to synergistically increase the strength to weight ratio of the composite block. To achieve this result, the composite engine block design includes a cylinder block or main frame containing plural cylinder cavities combined with a plurality of internally disposed, cross frames interleaved with the cylinder cavities. A ladder frame encompassing in part the crankshaft receiving cavity of the engine block is also provided wherein the ladder frame is designed to concentrate additional rigidifying support on the base of each cross frame of the main frame to increase synergistically the strengthening effect of connecting the main and ladder frames.

Yet another object of this invention is to provide an engine block design including vibration control or reducing structure for reducing the level of vibration of the block during engine operation wherein the vibration control structure includes a plurality of concavities formed in the outer side wall of the composite engine block in registry with the rigidifying structure of both the main engine block or frame and the base supporting ladder frame.

Still another object of this invention is to provide a composite engine block design characterized by a light weight and streamlined configuration wherein the coolant and lubrication flow paths are formed integrally within the composite engine block in such a way as to provide unobstructed flow throughout. The composite engine block structure is adapted to receive cylinder liners having stops located intermediate the ends of the liners and further is characterized by specially designed coolant and lubrication flow paths arranged to pass between the spaces formed by the cylinder liners when placed within the engine block.

A still more specific object of this invention is to provide a composite engine block design including inlet and outlet coolant manifolds formed in parallel adjacent relationship along one side wall of the composite engine block. The inlet coolant manifold communicates with a coolant flow chamber surrounding each cylinder liner, and the outlet coolant manifold receives return coolant from each coolant flow chamber through a path including the engine head and discharge openings formed in the top wall of the engine block. This arrangement causes the return coolant to flow downwardly from the engine head into the outlet coolant manifold.

Still another object of this invention is to provide a composite engine block design including a crankshaft receiving cavity adjacent the lower side of the engine block and a camshaft receiving cavity adjacent the upper side of the engine block wherein lubrication fluid is supplied to the bearing supports located in the respective crankshaft and camshaft receiving cavities by means of a parallel linear supply passage positioned intermediate the crankshaft and camshaft cavities. A linear supply branch extends from the linear supply passage upwardly to each camshaft bearing support and downwardly to a corresponding crankshaft bearing along a single linear path, thereby causing lubrication fluid to move in opposite directions along each linear supply branch from the intermediate linear supply passage to the respective bearing supports.

Another object of this invention is to provide a composite engine block including a main frame containing a plurality of closely spaced cylinder cavities for receiving cylinder liners having mid stops with each cylinder cavity being separated by a cross frame formed by connecting pillars extending between corresponding head bolt bosses and cap screw bosses. Each cross frame includes a cross wall intersecting and connecting with the upper wall of the engine block, the head bolt bosses, the connecting pillars, the cap screw bosses and the crank shaft bearing supports. While the cross wall is considerably thinner than the pillars and bosses to which it is connected, the arrangement of such elements into a single cross frame extending generally perpendicularly to the side walls and the top or head engaging wall of the engine block results in an extremely rigid overall structure in which the major loading forces tend to be concentrated within the connecting pillars. During the casting of the main frame of the composite engine block, the design and location of the connecting pillars provides a convenient flow path for molten casting metal. Accordingly, the disclosed engine block design not only achieves a high strength to weight ratio but also achieves this result without complicating the process of casting the engine block.

Still another object of this invention is to provide a ladder frame for providing significant additional support to the main frame of the composite engine block. In particular, the ladder frame is adapted for connection with the lower portion of the engine block main frame wherein the ladder frame includes first and second side walls forming extensions of the main frame side walls and a plurality of pairs of strengthening pillars, one pillar of each pair being connected to the inside surface of the first side wall and the other pillar of each pair being connected to the inside surface of the second side wall. A plurality of struts are also provided with each strut being connected at one end to one pillar and at the other end to another pillar of each pair of strengthening pillars thereby forming a plurality of rigidifying base frames within the ladder frame of the composite engine block. By positioning the rigidifying base frames within extensions of the planes defined by the cross frames, the rigidifying frames can be formed to extend into the interior of the engine block while still clearing the rotating counter weights of the crankshaft.

Yet another object of the subject invention is to provide a very compact, composite engine block structure having an exterior which is unobstructed by fluid flow conduits. In particular, the ladder frame described above includes an integrally formed lubrication pump housing interconnected with the lubrication fluid flow passage in the main frame of the composite engine block by fluid passages formed in the side walls of the ladder and main frames.

Still other and more specific objects of this invention may be appreciated by consideration of the following Brief Description of Drawings and the following description of the Best Mode for Carrying Out the Invention.

BRIEF DESCRIPTION OF DRAWINGS

FIG. 10 is an end elevational view of the ladder frame illustrated in FIG. 1.

FIG. 11 is an elevational view of the opposite end of the ladder frame illustrated in FIG. 10.

FIG. 13 is a cross sectional view taken along the lines 13—13 of the ladder frame illustrated in FIG. 12.

FIG. 14 is a cross sectional view taken along lines 14—14 of the ladder frame illustrated in FIG. 12.

FIG. 15 is a cross sectional view taken along lines 15—15 of the ladder frame illustrated in FIG. 17.

FIG. 16 is a cross sectional view taken along lines 16—16 of the ladder frame illustrated in FIG. 12.

BEST MODE FOR CARRYING OUT THE INVENTION

The development of an extremely light weight streamlined and high strength durable engine block has long been a desire of internal combustion engine designers. With the ever increasing costs of fossil fuels, the need for a light weight internal combustion engine for over-the-road vehicles has become acute particularly among commercial users of heavy duty vehicles such as trucks, tractors and other heavy road equipment. Normally engines used in such vehicles are of the compression ignition (diesel) type which inherently operate at a higher cylinder pressure levels than do spark ignition type internal combustion engines and thus require higher strength, heavier engine blocks. Moreover, engines of this type must be designed for extremely rugged use under greater strain and for longer periods than passenger vehicle engines. It is the purpose of this invention to provide a composite engine block design especially well suited for heavy duty compression ignition engines characterized by great strength, light weight and long term durability without in any way sacrificing the fuel efficiency and simplicity of operation normally associated with compression ignition internal combustion engines. Moreover, the disclosed design is expressly adapted to reduce the audible vibration associated with the operation of conventional compression ignition internal combustion engines.

Figure 1:
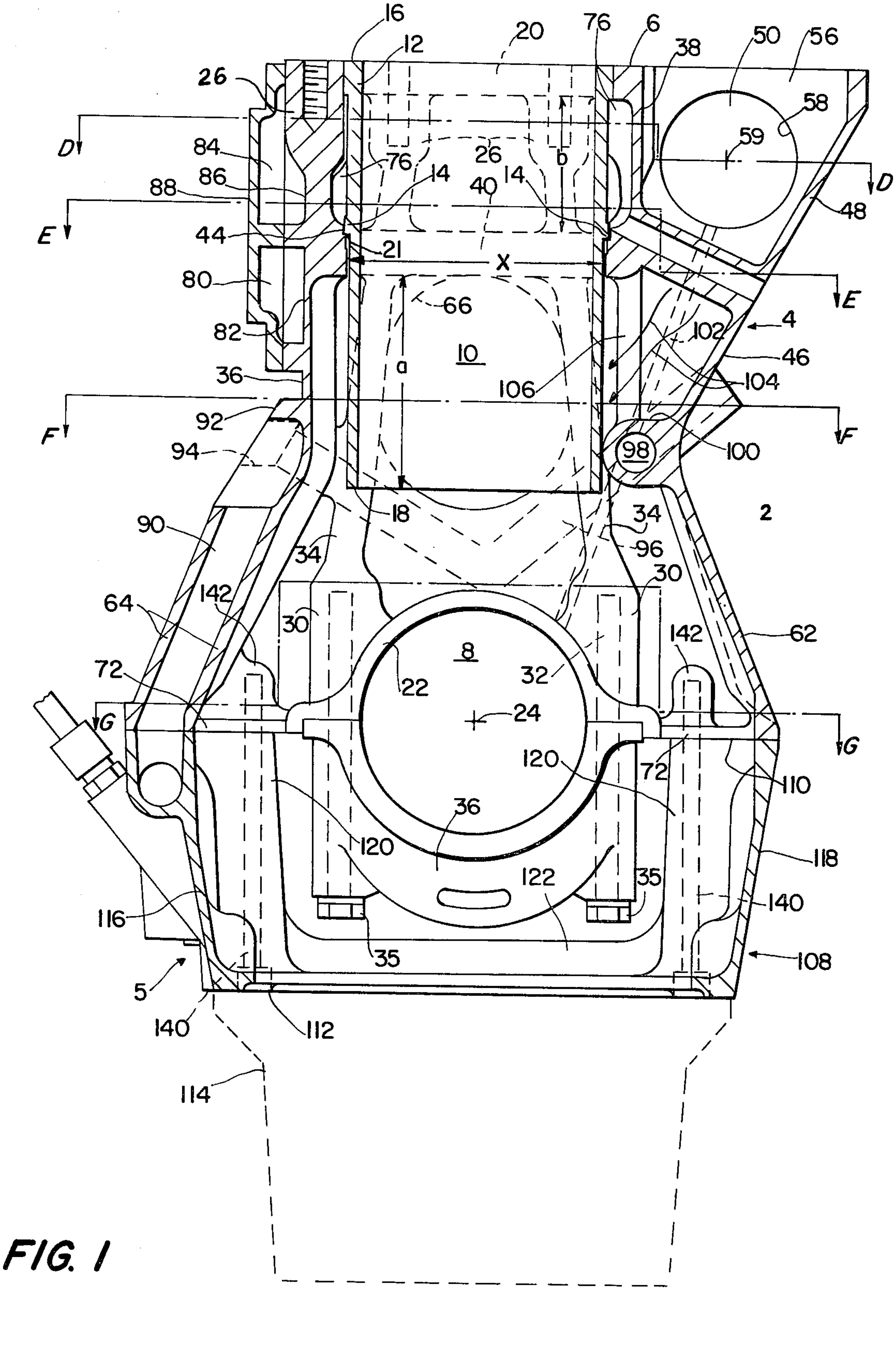
FIG. 1 is a cross sectional view of the composite engine block structure designed in accordance with the subject invention.

Reference is made to FIG. 1 wherein a cross sectional view of a composite engine block 2 designed in accordance with the subject invention is illustrated. In particular, the disclosed engine block includes a main frame 4 having a head engaging surface 6 and a crankshaft receiving cavity 8 on an opposed side of the main frame 4. An oil pan adaptor frame or ladder frame 5 is mounted on the base of main frame 4 for providing added strength to the composite engine block as will be explained in greater detail hereinbelow. A plurality of closely spaced cylinder cavities 10, only one of which is illustrated in FIG. 1, are provided in the main frame 4 extending from the head engaging surface 6 toward the crankshaft receiving cavity 8. Within each cylinder cavity 10, a piston liner 12 is positioned to receive an engine piston (not shown) for reciprocating motion during engine operation.

The cylinder liners 12 are of the type illustrated in U.S. patent application Ser. No. 959,702, filed Nov. 13, 1978, and assigned to the same assignee as the subject invention. A cylinder liner 12 of the type disclosed in the above noted co-pending patent application is illustrated partially in cross section in FIG. 1. Each such cylinder liner 12, having a generally hollow cylindrical body, is provided with an external liner stop 14 intermediate the liner ends 16 and 18. Corresponding liner engaging stop means 21 are formed inside main frame 4 for engaging the external liner stops 14 of the cylinder liners 12 to support or retain the liners in a position in which each liner is free of all direct contact with the main frame 4 along a substantial portion of the axial length of the liner commencing at end 18 and extending up to the liner engaging or stop means 21. This axial distance is generally denoted by the letter "a" in FIG. 1. As will be described in greater detail hereinbelow, the main frame cylinder cavities 10 are arranged such that a plurality of interliner spaces are formed between the liners disposed within the respective cylinder cavities 10 of the main frame 4.

Figure 2:
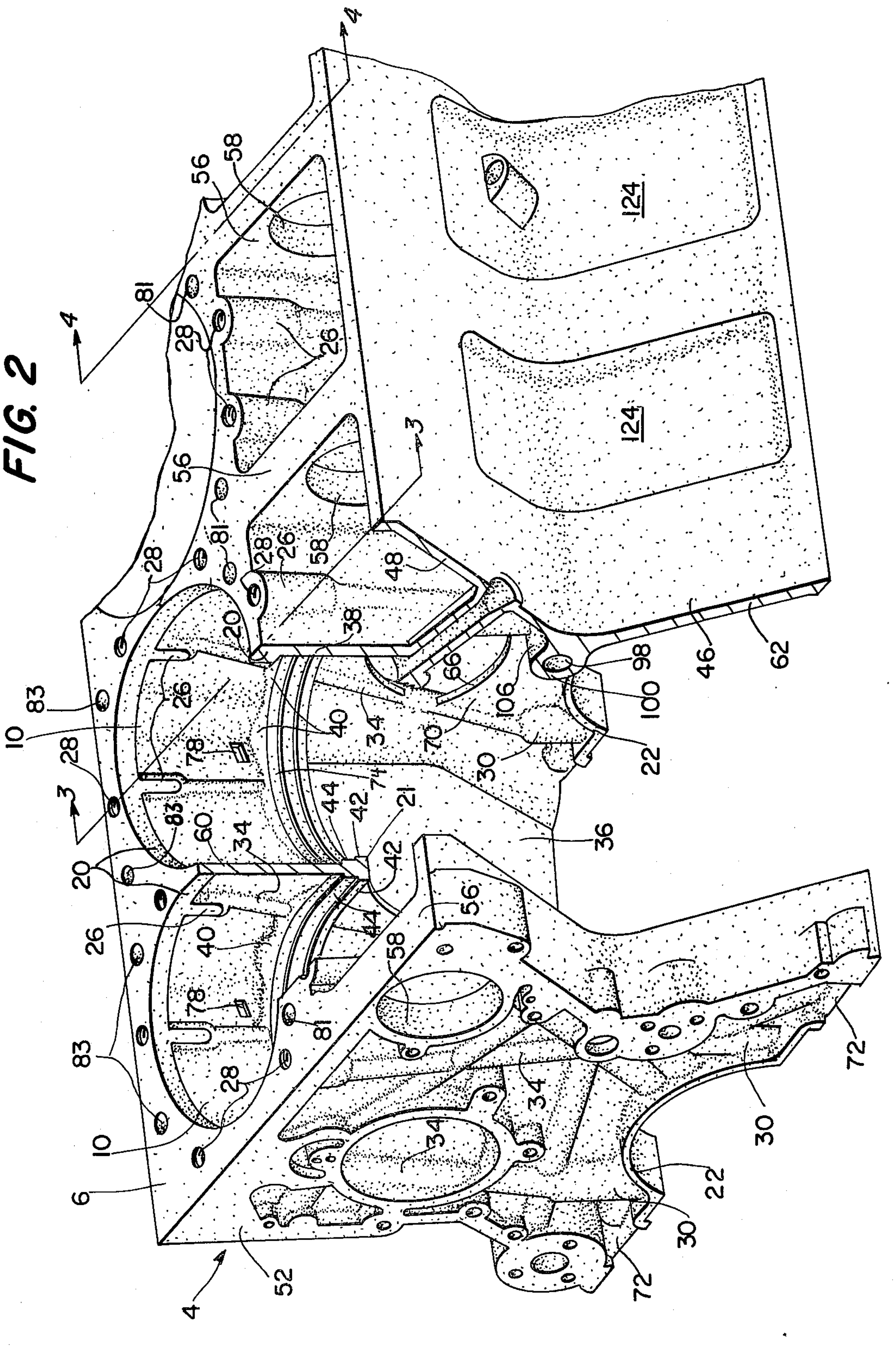
FIG. 2 is a partially cut-away perspective view of the main frame or cylinder block of the composite engine block design illustrated in FIG. 1.

Referring now jointly to FIGS. 1 and 2, it is apparent that the cylinder cavities 10 are rather closely spaced in generally parallel, vertically aligned positions above the crankshaft receiving cavity 8. The upper surface 6 of the main frame 4 is formed by a head wall 20, the outer surface of which forms the head engaging surface 6. Disposed within the crankshaft receiving cavity 8 are a plurality of crankshaft bearing supports 22 for receiving and supporting the crankshaft bearings, not illustrated, which are adapted to support the crankshaft for rotation about axis 24. Surrounding the top end of each cylinder cavity 10 are a plurality of spaced head bolt bosses 26 containing threaded holes 28 opening into surface 6 for receiving head bolts adapted to attach the engine head to the head engaging surface 6, thereby capping the cylinder cavities. Each crankshaft bearing support 22 is provided with a pair of cap screw bosses 30 containing threaded holes 32 for receiving bearing cap bolts 35 for attaching a bearing cap 36 to each corresponding bearing support 22. A pair of head bolt bosses 26 is provided at each end of the main frame and between each of the cylinder cavities 10 within the inter cavity spaces referred to above. A connecting pillar 34 extends between each cap screw boss 30 and one of the pair of head bolt bosses 26 arranged in a position generally vertically above the corresponding cap screw bosses 30 of each crankshaft bearing support 22. Since main frame 4 is normally formed by a metal casting operation, flow passageways need to be provided within the casting mold to insure that molten metal reaches all portions of the block being molded. The portions of casting mold forming pillars 34, can be used to function as passages for metal flow during the casting operation while the resulting pillars perform a strengthening function. Thus, pillars 34 tend to transmit the thrust forces resulting from fuel combustion within each cylinder from the engine head through the head bolts to the crankshaft by means of the cap screw bosses 30 and the crankshaft bearing supports 22. As is illustrated in FIG. 1, and more clearly in FIG. 2, each crankshaft bearing support 22 includes a pair of cap screw bosses 30 linked to a pair of connecting pillars 34, and a pair of head bolt bosses 26 to form one of a plurality of cross frames interleaved with the cylinder cavities 10 of the main frame 4. The central axis of the bosses and pillars forming each cross frame are positioned within a single cross plane which is parallel to the remaining cross planes and which is perpendicular to the rotational axis 24 of the crankshaft.

Extending along the left side of the main frame 4, as illustrated in FIG. 1, is an outer side wall 36 aligned generally with the cylinder cavities 10. Outer side wall 36 extends in a generally perpendicular direction downwardly from the head wall 20 toward the crankshaft receiving cavity 8. Disposed on the opposite side of the cylinder cavities 10 from side wall 36 is an inner side wall 38 which similarly extends in a generally perpendicular direction downwardly from the head wall 20 toward the crankshaft receiving cavity 8. The liner stop means 21 is formed in a support wall 40 parallel to and spaced from head wall 20. The support wall 40 intersects with and is connected to outer side wall 36 and inner side wall 38 as is best illustrated in FIG. 1. Support wall 40 also intersects and connects with connecting pillars 34 to form an extremely strong and rigid integral unit. Within each cylinder cavity 10, the support wall 40 contains a circular aperture 42 having a diameter slightly greater than the diameter of the portion of each cylinder liner indicated by "X" in FIG. 1. The diameter of circular aperture 42 is less than the diameter of the external liner stop 14 and the upper side of each circular aperture 42 is counter bored at 44 to provide a recess for receiving the external liner stop 14 all as illustrated in FIG. 1.

On the right side of main frame 4 is provided an auxiliary side wall 46 having a generally V-shaped cross section as illustrated in FIGS. 1 and 2. The upper half 48 of the auxiliary side wall 46 is spaced from the inner side wall 38 to define a camshaft receiving cavity 50 extending along the aligned cylinder cavities 10 from one end 52 to the other end (not illustrated) of the main frame 4. A plurality of spacing webs 56 are connected with and extend generally perpendicularly between inner side wall 38 and the upper half 48 of the auxiliary side wall 46. As is clearly illustrated in FIG. 2, spacing webs 56 reside generally within the plane defined by the rigidifying frames respectively associated with each crankshaft bearing support 22. An aperture 58 contained in each spacing web 56 is configured to receive and support a bearing for a conventional camshaft receiving cavity 50 and to rotate about an axis 59 parallel to the rotational axis 24 of the crankshaft.

Figure 3:
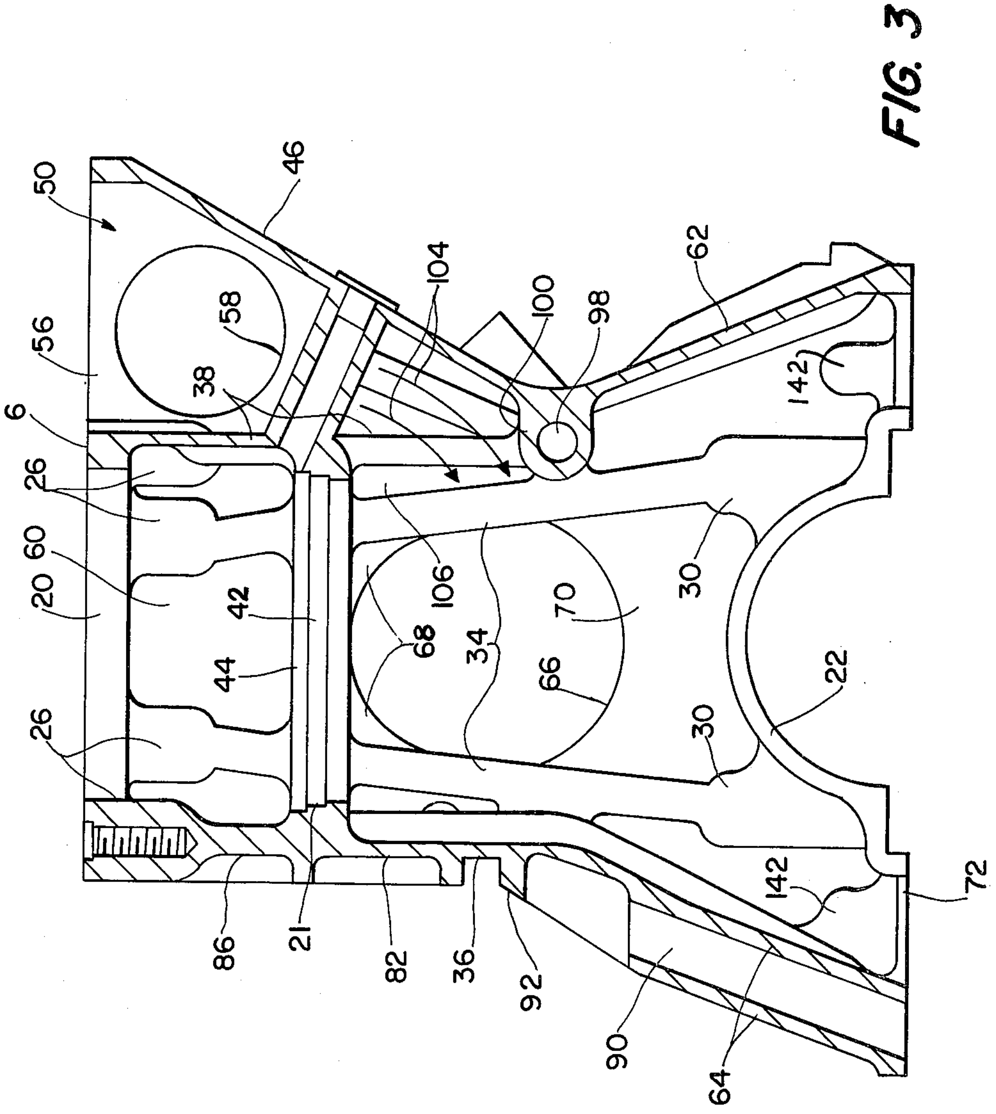
FIG. 3 is a cross sectional view of the main frame taken along lines 3—3 of FIG. 2.

In order to further strengthen the main frame 4, each rigidifying frame includes a cross wall 60 interconnecting each pair of head bolt bosses 26, associated connecting pillars 34 and cap screw bosses 30. The cross wall 60 is further connected with the head wall 20, the support wall 40 and the associated crankshaft bearing support 22. As illustrated in FIGS. 1 and 2, the lower half 62 of the auxiliary side wall 46 is flared outwardly away from the crankshaft bearing supports 22 in order to provide sufficient room within the crankshaft receiving cavity 8 for rotational movement of the cranks and connecting rods of the internal combustion engine. As is also apparent in FIGS. 1 and 2, outer side wall 36 includes an outwardly flared lower half 64 which is also designed to provide sufficient room for rotational movement of the cranks and connecting rods of the internal combustion engine. To provide further rigidity to this portion of the engine structure, the cross walls 60 of each rigidifying frame are extended outwardly beyond cap screw bosses 30 into engagement with the lower halves 62 and 64 of the auxiliary side wall 46 and the outer side wall 36, respectively. The thickness of the cross walls 60 is substantially less than the cross sectional diameters of the bosses (26 and 30) and connecting pillars 34 to which the respective cross walls 60 are connected in order to reduce the total weight of the composite engine block. In this regard, rounded apertures 66 are formed in the portion of each cross wall 60 extending between the support wall 40 and each respective crankshaft bearing support 22. The rounded aperture is shaped as illustrated in FIG. 3 to leave upper support webs 68 interconnecting each connecting pillar 34 with support wall 40 and a lower support web 70 interconnecting the cap screw bosses 30 and the associated connecting pillars 34 of each rigidifying frame. Upper and lower support webs 68 and 70 will be described in greater detail hereinbelow. Provision of aperture 66 not only lightens the engine block but also facilitates easier casting of main frame 4 by providing an opening through which the mold cores necessary to form cavities 10 may be interlinked for added stability and positional accuracy during the molding process. To further assist in rigidifying the crankshaft bearing supports 22, horizontally oriented interconnecting webs 72 are provided between the respective sides of each crankshaft bearing support 22 and the corresponding side wall of the main frame 4.

The composite engine block of FIGS. 1 and 2 is provided with coolant passage forming means for directing cooling fluid through the main frame 4 along a coolant path shaped to bring the flow into direct contact with the cylinder liners 12 only along a portion of the axial length of each liner extending between the projection 74 formed by the counter bored aperture 42 and the head wall 20. Because the inside surfaces of the outer side wall 36, the cross walls 60 and the inner side wall 38 surrounding each cylinder liner between head wall 20 and support wall 40 are spaced from the exterior surface of the cylinder liner, a coolant flow chamber 76 having a generally cylindrical configuration is formed within the main frame 4 in surrounding relationship with the upper section of each cylinder liner. As is explained in co-pending application Ser. No. 959,702, filed Nov. 13, 1978, it has been found that only the upper section "b" of each cylinder liner 12 need be brought into contact directly with the coolant fluid flowing through the main frame in order to provide sufficient cooling of the cylinder liner 12 during engine operation. Cooling fluid is supplied to each coolant flow chamber 76 through a pair of inlet ports 78 formed in the outer side wall 36 adjacent the intersection of the outer side wall 36 and support wall 40 as illustrated in FIGS. 1 and 2. As will be explained in further detail hereinbelow, all of the inlet ports 78 are interconnected with an inlet coolant manifold 80 formed in part, by a linear inlet channel 82 formed on the outside surface of the outer side wall 36 adjacent to and slightly below the intersection of the outer side wall 36 and support wall 40. A pair of outlet ports 81 (FIG. 2) are formed in the head wall 20 for communication with each coolant flow chamber 76. Note that the outlet ports 81 are formed generally adjacent the intersection of the head wall 20 with the inner side wall 38. Although not illustrated in the drawings, the outlet ports 81 cause coolant to flow from the coolant flow chambers 76 into the engine head formed with a plurality of flow paths, one of each being positioned to register with one of the outlet ports. After flowing through the engine head, the coolant from each outlet port 81 is discharged from the head into a discharge port 83, formed in the head wall 20 adjacent the intersection of the head wall 20 with the outer side wall 36. As can be noted in FIG. 2, discharge ports 83 are arranged to cause coolant to flow downwardly from the engine head into an outlet manifold 84 formed in part by an outlet channel 86 located on the outside surface of outer side wall 36. The inlet coolant manifold 80 and outlet coolant manifold 84 are arranged generally in a parallel position along the upper portion of outer side wall 36. The respective manifolds are sealed by means of a jacket including a single integral cover member 88 which may be attached in sealing relationship with the inlet channel 82 and the outer channel 86, respectively. The inlet and outlet manifolds are connected to a radiator and coolant pump system, not illustrated, as is conventional in internal combustion engines.

As can be appreciated from a consideration of FIGS. 1 and 2, the flow path of coolant within each coolant flow chamber 76 includes a directional component oriented from outer side wall 36 toward inner side wall 38 and another directional component oriented from the support wall 40 toward the head wall 20. While cross walls 60 contain a large aperture 66 below support wall 40, it has been found that the portion of cross wall 60 extending between head wall 20 and support wall 40 is preferably solid and free of any voids which would allow passage of cooling fluid therethrough. Tests have shown that the provision of a large weight reducing aperture in this portion of cross walls 60 can result in damaging distortion in the main frame 4 although a small pressure equalizing hole could possibly be employed.

The composite engine block of FIGS. 1 and 2 includes a lubrication flow passage forming means for directing lubrication fluid through the main frame 4 along a lubrication flow path which bypasses entirely the portion of the interliner spaces extending between the head engaging surface 6 and the projection 74 of the liner stop means 21. In particular, the lubrication flow passage forming means includes a lubrication fluid entry passage 90 formed in the flared section 64 of the outer side wall 36, whereby the entry passage 90 may receive lubrication fluid from a lubrication fluid pump mounted within the ladder frame 5 as will be discussed in further detail hereinbelow. Lubrication filter mounting means 92 are formed on the outside surface of the flared portion 64 of outer side wall 36 such that lubrication fluid received in lubrication fluid entry passage 90 is passed into a lubrication filter (not illustrated) mounted on the side of the main frame 4. After passing through the filter, the lubrication fluid is passed back into the main frame 4 through a main lubrication fluid supply port 94 into a cross flow passage 96 lying within the plane defined by a cross frame bisecting the entire main frame 4. Flow passage 96 connects with a linear supply passage 98 formed in a lubrication fluid supply rifle 100 extending horizontally along the main frame at the intersection of the inner side wall 38 and the auxiliary side wall 46.

For structural rigidity purposes, the lubrication fluid rifle 100 is integrally connected with the inner side wall 38. As can be seen most clearly in FIG. 1, the lubrication fluid rifle 100 is positioned substantially intermediate the crankshaft receiving cavity 8 and the camshaft receiving cavity 50. To supply lubricating fluid to the crankshaft breaking supports 22 and the corresponding camshaft bearing supports defined by spacer webs 56, a linear supply branch 102 is positioned in the plane defined by the corresponding cross frame. Each linear supply branch 102 intersects at one end with the camshaft bearing aperture 58 of the corresponding spacing web 56 and at the other end with the bearing receiving surface of the bearing support 22. Each linear supply branch 102 also intersects with linear supply passage 98 to cause lubrication fluid supplied to the linear supply passage 98 to travel in opposed directions from the linear supply passage 98 upwardly through each linear supply branch 102 to the corresponding camshaft aperture 58 and downwardly through the same linear supply branch 102 to supply the corresponding crankshaft bearing support 22. By forming the supply branches in this manner, a single drilling of the cast main frame 4 may be made in order to form each linear supply branch 102. Savings in machining costs result from this construction.

Oil returns by gravity flow from the camshaft receiving cavity 50 as indicated by arrows 104 through a plurality of openings 106 formed in the inner side wall 38 between support wall 40 and lubrication fluid rifle 100. Openings 106 (illustrated in FIGS. 1, 2) communicate with the inter cylinder cavity spaces formed between the portion of the cylinder liners extending below support wall 40. By this arrangement, a substantially unobstructed and wide open lubrication fluid return path is formed within the main frame 4 with more than sufficient capacity to handle the volume of returning lubrication fluid which could be expected under all engine operating conditions. This wide open return path is achieved without interferring with the coolant flow path around the cylinder liner and without expanding the main frame size in either the axial or cross axial direction.

The ladder frame means 5, illustrated in FIG. 1, serves the critically important function of strengthening the main frame 4 by providing localized support to the cross frames and of forming an extension of the crankshaft receiving cavity 8 to substantially encompass the crankshaft and to provide sufficient space for rotational movement of the cranks of the crankshaft. The ladder frame means 5 includes a hollow skirt member 108 having an lower surface 112 for engaging the oil pan 114. The hollow skirt member 108 includes a first side wall 116 forming an extension of the lower portion 64 of outer side 36 of the main frame 4 and a second side wall 118 forming an extension of the lower portion 62 of auxiliary side wall 46 of the main frame 4. A plurality of pairs of strengthening pillars 120 extend between upper surface 110 and the lower surface 112 with one strengthening pillar of each pair being integrally connected with the inside surface of the first side wall 116 and the other strengthening pillar 120 of each pair being integrally connected with the inside surface of the second side wall 118. Located adjacent the lower surface 112 are a plurality of struts 122, each strut being connected at one end to one strengthening pillar of a pair of strengthening pillars and at the other end to the other strengthening pillar of a pair of strengthening pillars, whereby each pair of strengthening pillars and the interconnected strut form a rigidifying base frame. As will be illustrated in greater detail hereinbelow, the various rigidifying base frames formed along the axial length of the ladder frame means 5 are positioned to coincide with the cross frames of the main frame 4 to thereby provide localized support to the cross frames.

Figure 4:
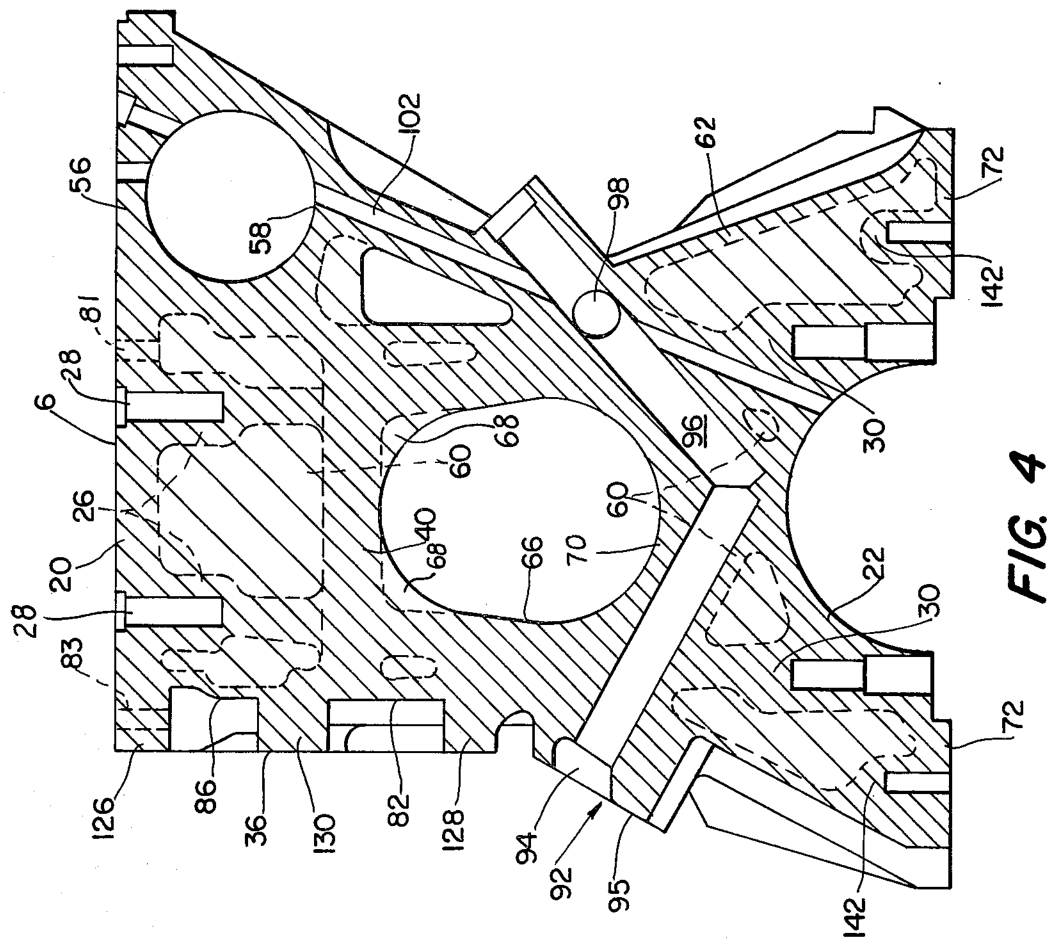
FIG. 4 is a cross sectional view of the main frame taken along lines 4—4 of FIG. 2.

Reference is now made to FIGS. 3 and 4 which show, respectively, cross sectional views of the main frame taken along lines 3—3 and 4—4 of FIG. 2. The corresponding elements referred to in FIGS. 1 and 2 are identified by the same reference numerals in FIGS. 3 and 4. Reference is particularly made to FIG. 3 which discloses one of the cross frames formed by the interconnection of a pair of head bolt bosses 26, connecting pillars 34 and cap screw bosses 30 which together interlink head wall 20 with crankshaft bearing supports 22. The lubrication fluid entry passage 90 formed in the lower half 64 of side wall 36 is also illustrated with greater clarity in FIG. 3. The return flow of oil illustrated by arrows 104 through opening 106 in inner side wall 38 is further clearly illustrated in FIG. 3.

Referring now particularly to FIG. 4, the cross flow passage 96 is illustrated as being formed in the cross wall 60 positioned at the bisecting cross section of main frame 4. This cross fluid passage 96 interconnects the main lubricating fluid supply port 94 with the linear supply passage 98 in order to transfer oil received through an oil filter unit, not illustrated, to the lubrication fluid rifle 100. Surrounding the main lubricating fluid support port 94 is a flat 95 forming part of the lubrication mounting means 92 which functions to assist in mounting an oil filter on the main frame as discussed above.

Figure 5A:
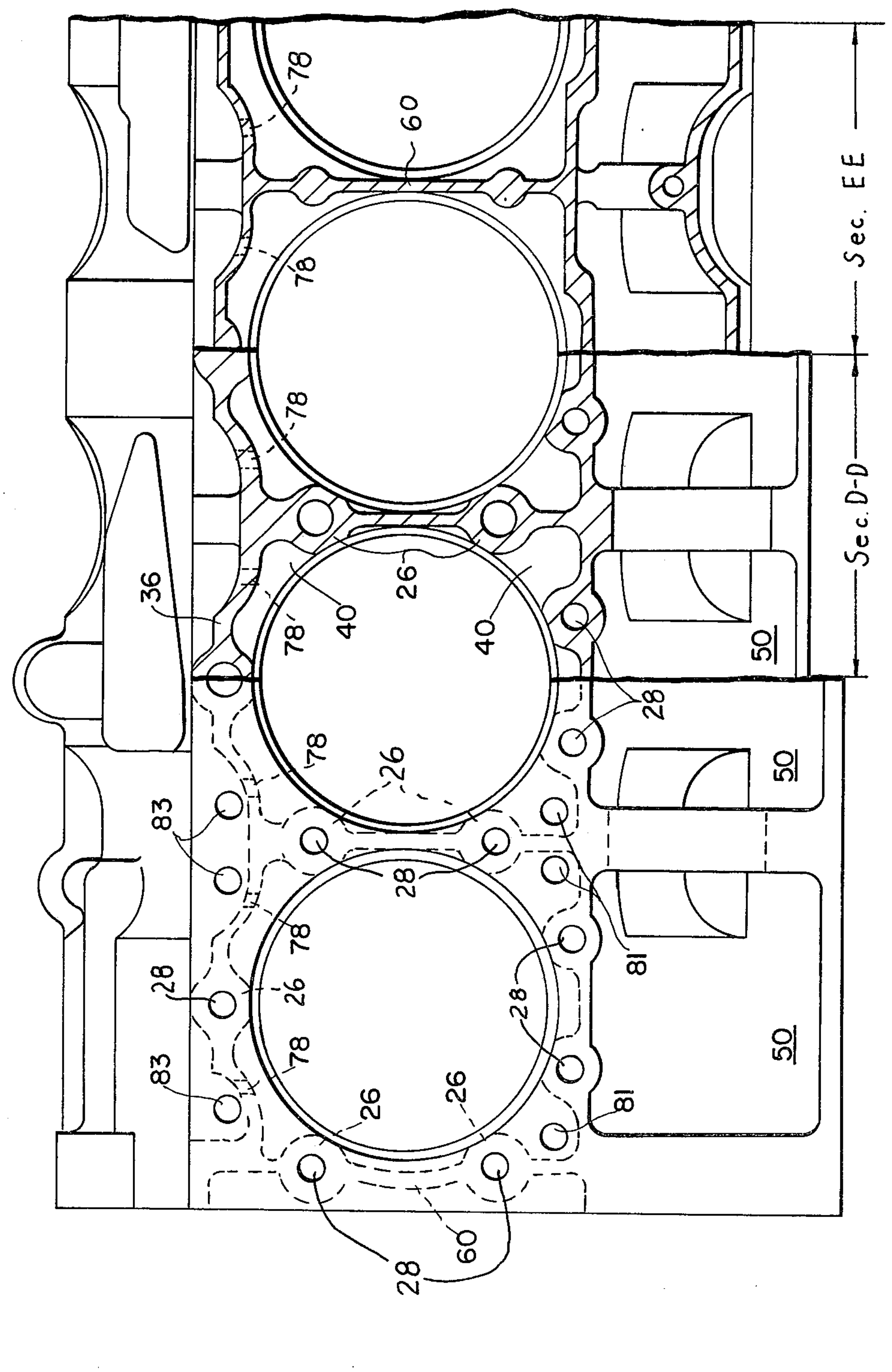
FIG. 5A is a composite of a top elevational view and a pair of cross sectional views taken along lines D—D and E—E of the main frame illustrated in FIG. 1.

Referring now to FIGS. 5A and B, the configuration of the side walls of the main frame and their interconnection with the cross frames is illustrated. In particular FIGS. 5A and B include a top elevational and a plurality of cross sectional views of the main frame taken along lines D—D, E—E, F—F, and G—G of FIG. 1. In these Figures, the inlet ports 78 leading from the inlet manifold 80 are clearly illustrated particularly in cross sectional views D—D and E—E, FIG. 5A. The outlet ports 81 and the discharge ports 83 are clearly shown in the top elevational section at the left hand side of FIG. 5A.

Figure 5B:
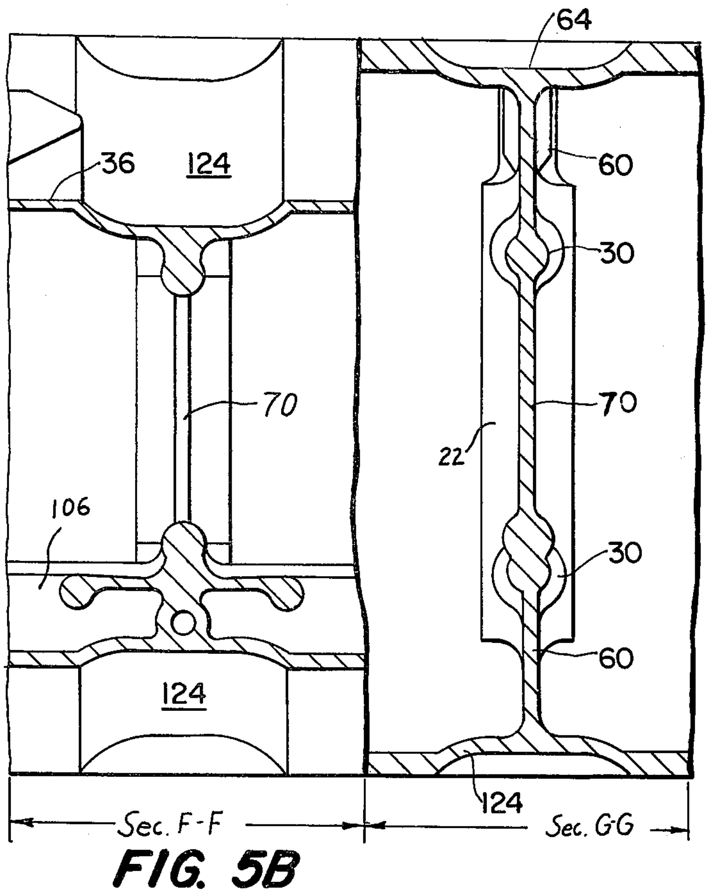
FIG. 5B is a composite of a pair of cross sectional views taken along lines F—F and G—G of the main frame illustrated in FIG. 1.
Figure 6:
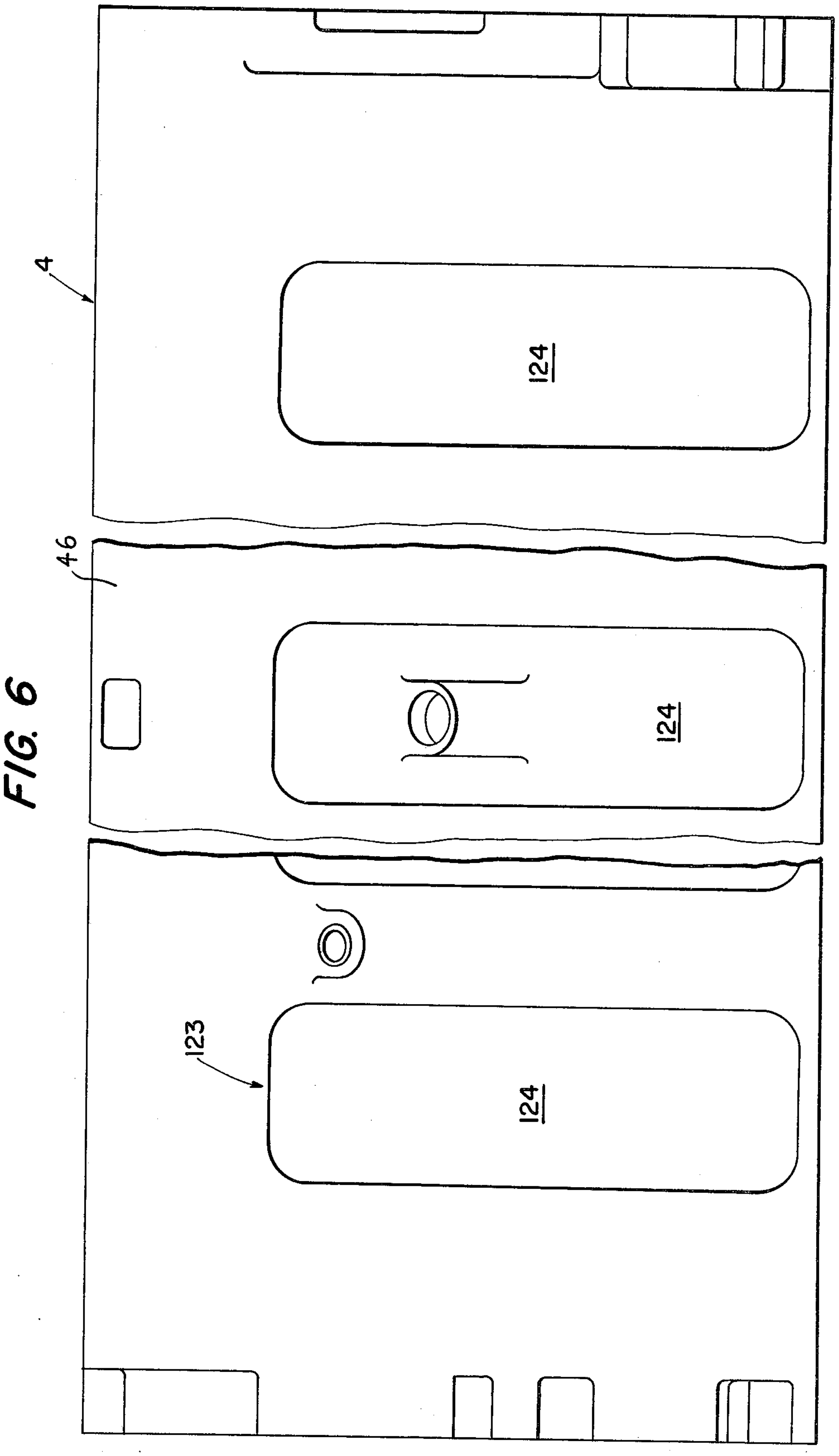
FIG. 6 is a broken elevational view of the left side of the main frame illustrated in FIG. 1.

Turning now to FIG. 6, the auxiliary side wall 46 is illustrated in broken side elevational view. FIG. 6 clearly illustrates the vibration reducing means 123 employed in the subject composite engine block design for reducing the audible level of vibration caused by operation of an engine. In particular, FIG. 6 illustrates a plurality of concavities 124 formed in the auxiliary side wall 46 in registry, respectively, with the cross frames of the type illustrated in FIG. 4. The cross sectional shape of these concavities 124 can be better understood by reference to sections E—E, F—F, and G—G of FIG. 5 wherein the shape of the concavities 124 is best illustrated. The purpose of these concavities is to raise the natural frequency of the composite engine block to a level above the frequency of the most audible vibrational perturbations produced by engine operation thereby forming a quieter running internal combustion engine.

Figure 7:
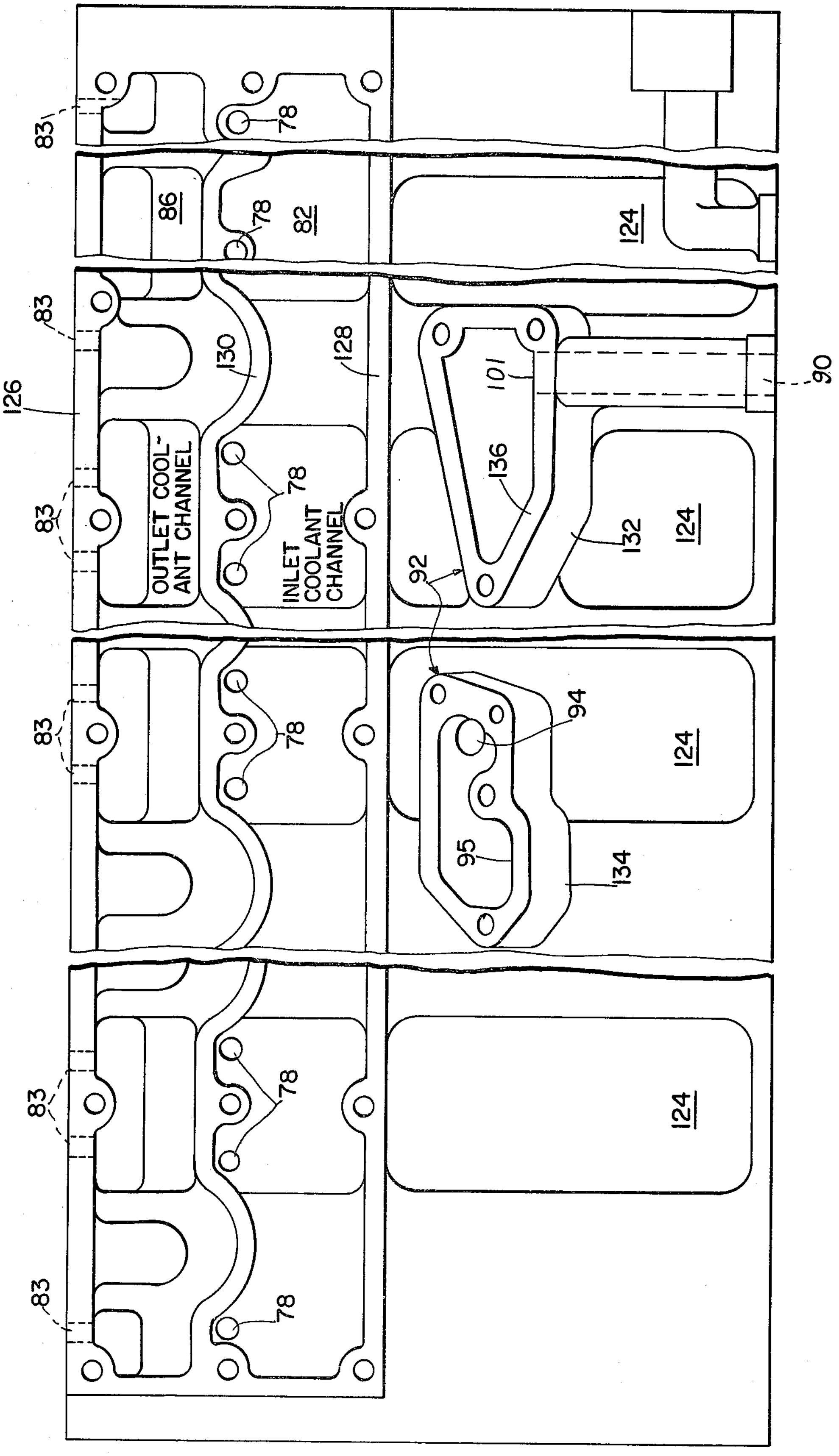
FIG. 7 is a broken elevational view of the right side of the main frame illustrated in FIG. 1.

FIG. 7 is a side elevational view of the outer side wall 36 which clearly discloses the inlet and outlet coolant channels 82 and 86, respectively. Outlet coolant channel 86 is formed on the upper side by an extension 126 (See FIG. 4) of head wall 20 extending outwardly beyond the intersection of head wall 20 and outer side wall 36. The lower section of inlet coolant channel 82 is formed by an extension 128 parallel to extension 126. A common undulating extension 130 divides the outlet coolant channel 86 and the inlet coolant channel 82. The undulating configuration of extension 130 permits inlet ports 78 to be formed by drilling at a perpendicular orientation with respect to the outer side wall 36 of the main frame 4. By thus avoiding the necessity for drilling the main frame side wall at an acute angle, manufacturing costs can be saved. Extensions 126, 128 and 130 terminate in a planar surface adapted to form a seal with a jacket means formed by integral cover 88, illustrated in FIG. 1.

The side elevational view of FIG. 7 also clearly illustrates the lubrication mounting means 92 which consist of projections 132 and 134 surrounding, respectively, the outlet 101 of the lubrication entry passage 90 and the main lubrication fluid supply port 94. Projections 132 and 134 terminate in planar surfaces 136 and 95, respectively, for sealing engagement with an oil filter unit, not illustrated.

Figure 8:
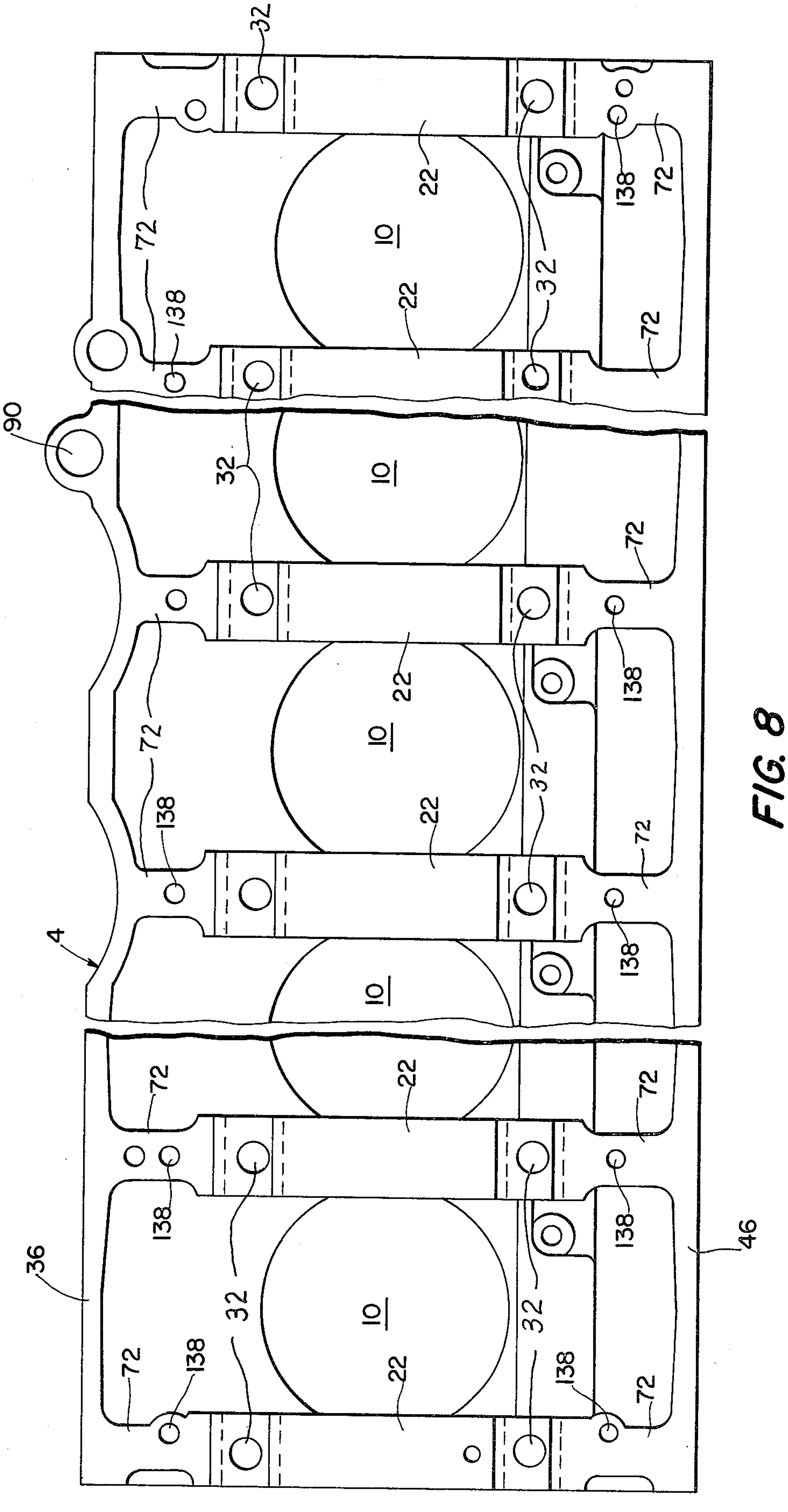
FIG. 8 is a broken bottom elevational view of the main frame illustrated in FIGS. 1 and 2.

FIG. 8 is a bottom elevational view of the main frame 4 illustrating the relative positions of cylinder cavities 10, outer side wall 36 and auxiliary side wall 46. As is clearly illustrated in FIG. 8, each of the crankshaft bearing supports 22 is interconnected with the respective side walls 36 and 46 by a pair of interconnecting webs 72 extending into integral connection with the respective side walls. The threaded holes 32 of each cap screw boss 30 is shown in this bottom elevational view of the main frame 4. Each interconnecting web 72 contains a threaded opening 138 for receiving connecting bolts 140 (FIG. 1) for attaching the ladder frame 5 to the bottom surface of the main frame 4. As is illustrated best in FIG. 1 threaded apertures 138 extend upwardly into connecting bosses 142 formed integrally with the corresponding interconnecting web 72 and cross wall 60.

Figure 9:
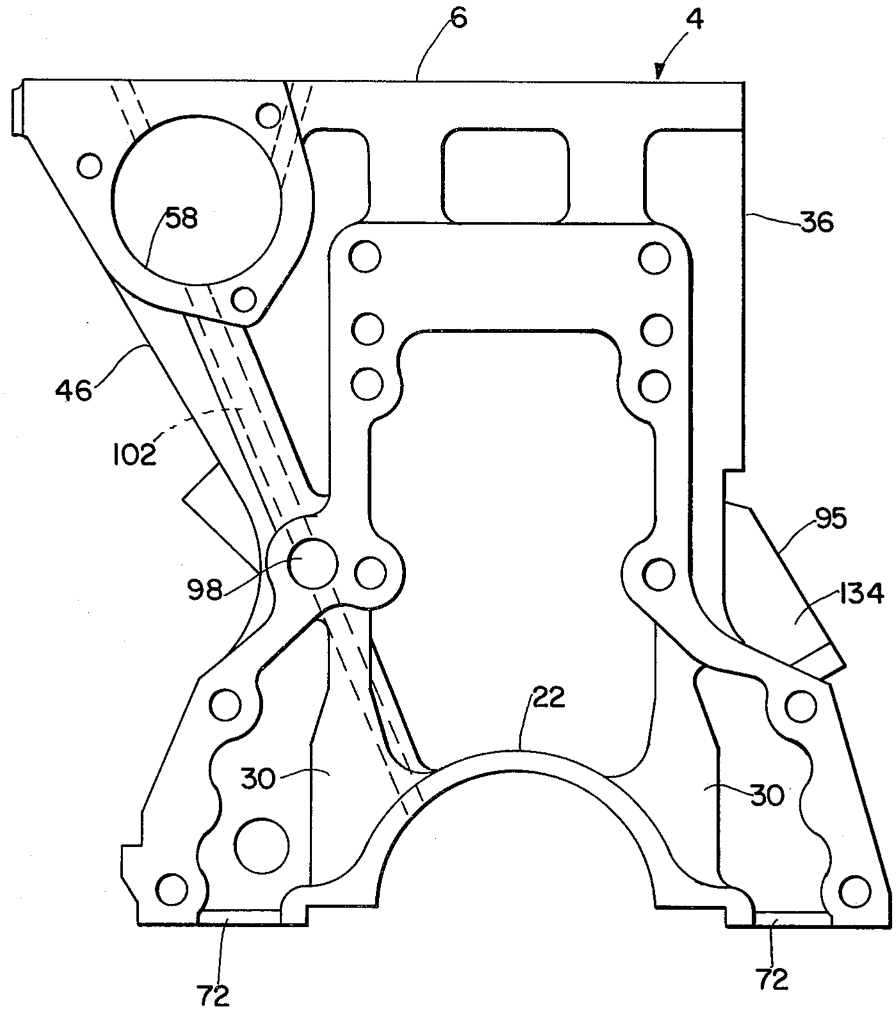
FIG. 9 is an end elevational view of the main frame illustrated in FIG. 1.

FIG. 9 is an end elevational view of the main frame 4 which clearly illustrates the relative positions of the various elements identified by reference numerals corresponding to those elements illustrated in FIGS. 1–8.

Turning now to FIG. 10, an end view is illustrated of the oil pan adaptor or ladder frame means 5. As was noted with reference to FIG. 1, the ladder frame 5 is formed by a hollow skirt member 108 including a first side wall 116 and a second side wall 118 formed between an upper surface 110 for engaging the base of main frame 4 and a bottom surface 112 for attachment to the oil pan of the internal combustion engine. As is clearly illustrated in FIG. 10, the ladder frame includes a lubrication fluid pump housing 143 including a cylindrical cavity 144 adapted to receive a lubrication fluid pump for supplying lubricating fluid to the internal combustion engine. A lubrication fluid discharge passage 146 extends from the cylindrical cavity 144 to a point on upper surface 110 registering with the lubrication fluid entry passage 90 of the main frame. By this arrangement, the lubrication fluid pump may force lubrication fluid through passage 146 into the main frame 4. A lubrication fluid intake passage formed in first side wall 116 extends from the oil pan engaging lower surface 112 into the cylindrical cavity 144 of the pump housing 143. The fluid intake passage 148 opens into the cylindrical cavity 144 of the lubrication fluid pump housing 143 at a point 149 substantially above the lowest point in the housing to permit lubrication fluid to be trapped within the housing when the lubrication fluid pump ceases operation. This arrangement causes the lubrication fluid pump to be self-priming upon start-up of the engine.

Figure 12:
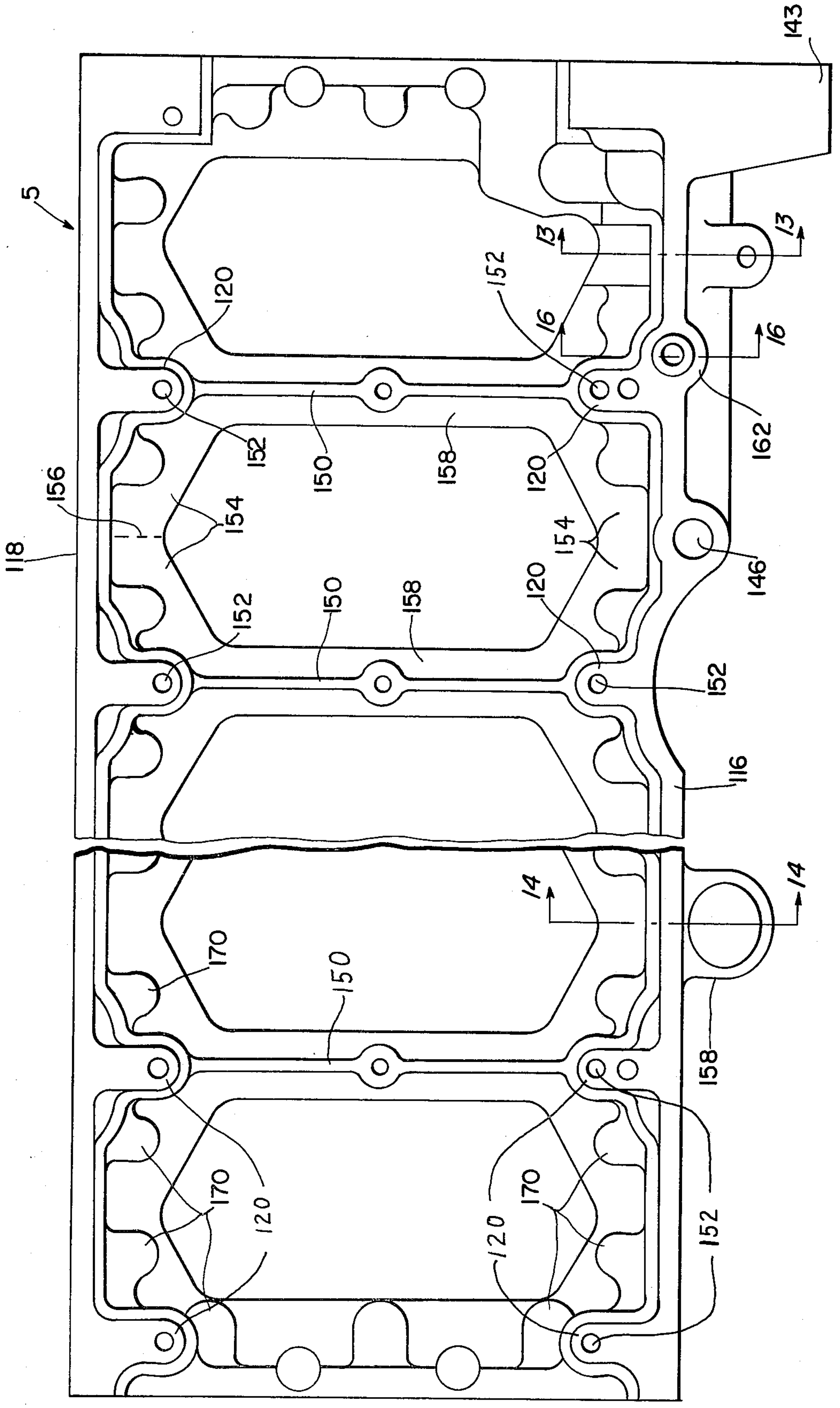
FIG. 12 is a broken top elevational view of the ladder frame illustrated in FIGS. 10 and 11.

FIG. 11 is an elevational view of the opposite end of the ladder frame 5 illustrated in FIG. 10 wherein a pair of strengthening pillars 120 are illustrated. To understand the function of these pillars, reference is also made to FIG. 12 which discloses a top elevational view of the ladder frame 5 and the pairs of strengthening pillars 120. As is apparent in FIG. 12, one strengthening pillar of each pair is integrally connected with first side wall 116 while the other pillar of each pair is connected integrally with the second side wall 118. As previously noted, each pillar is positioned to register with a corresponding interconnecting web 72. Each pair of strengthening pillars is connected along the lower surface 112 by a strut 150 connected at one end to one pillar of a pair and at another end to the other pillar of a pair to form a rigidifying base frame designed to strengthen a corresponding cross frame within main frame 4. FIG. 12 discloses that each strengthening pillar 120 contains an aperture 152 for receiving a connecting bolt 140 (FIG. 1). The threaded ends of bolts 140 are received within threaded apertures 138 (FIG. 8) of the main frame 4 such that the ladder frame 5 may be securely connected at each point of contact between a connecting web 72. A plurality of strengthening webs 154 are formed in the plane of lower surface 112 and are integrally formed with struts 150 and the ladder frame side walls 116 and 118. The configuration of webs 154 has been designed to maximize the rigidifying effect which such webs have on the connection of the individual strengthening pillars 120 and the corresponding side walls of the ladder frame 5. Strengthening webs 154 take a triangular form filling the corner intersection of each strengthening pillar 120 and the corresponding side wall over a substantial area of the lower surface 112. Adjacent webs 154 join integrally at the mid point between adjacent pillars as illustrated by dashed line 156 to form a single integral web extending inwardly from each side wall. Strengthening webs 154 may include extensions 158 from one side wall to the other side wall along each strut 150. The width of such extensions 158 in the axial direction of the ladder is limited, however, to insure sufficient clearance of the rotating counterweight attached to the crankshaft of the engine.

FIGS. 13 and 14 disclose various cross sectional views of the ladder frame taken along corresponding lines in FIG. 12. In particular, FIG. 13 illustrates the dip stick boss 159 for receiving a dip stick assembly, not illustrated. FIG. 14 discloses an oil fill opening 161 for the crankcase of the engine.

Figure 17:
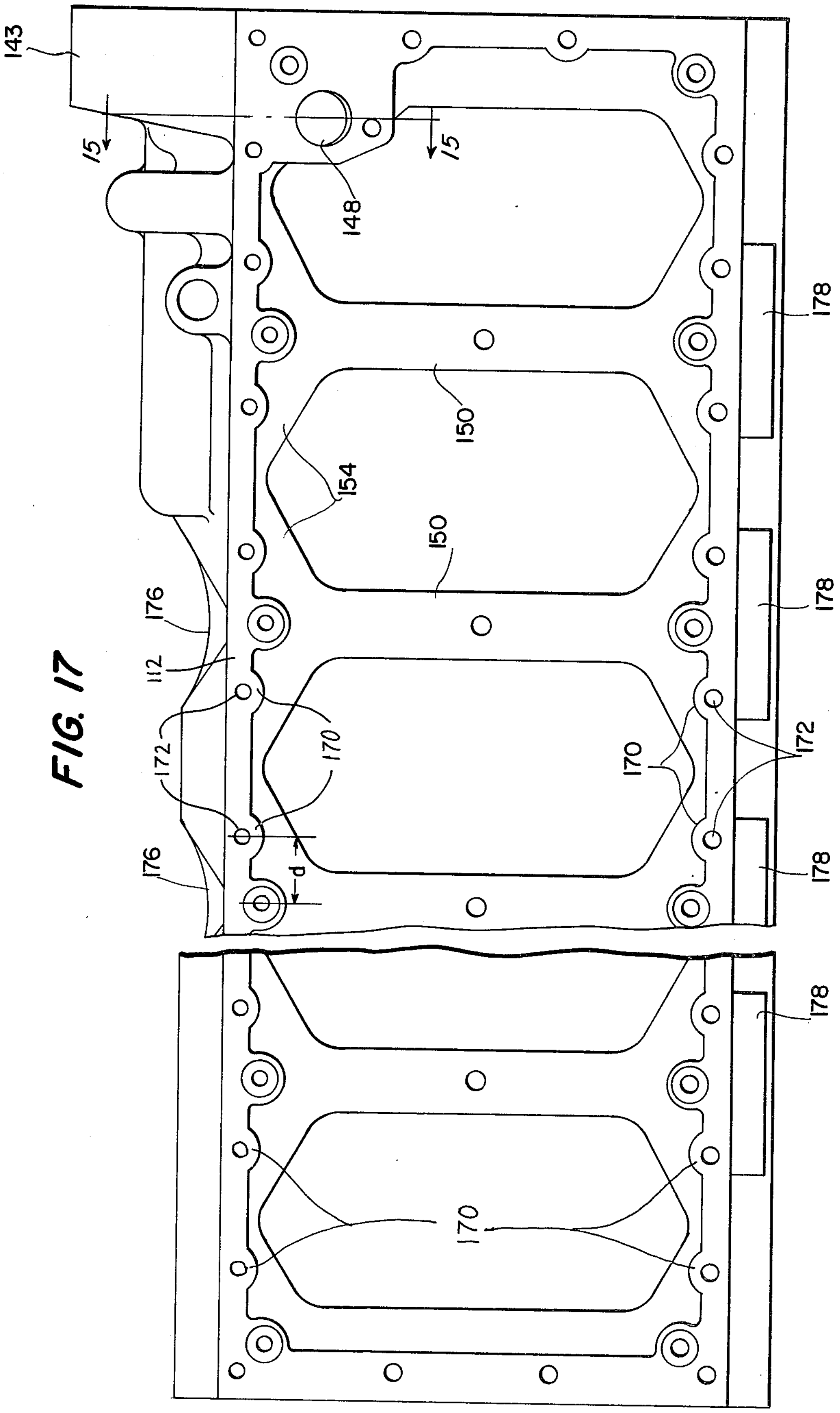
FIG. 17 is a broken bottom elevational view of the ladder frame illustrated in FIG. 10.

FIG. 15 discloses a cross sectional view of the lubrication fluid pump housing 143 taken along lines 15—15 of FIG. 17 including the lubrication fluid intake passage 148 communicating with the cylindrical cavity 144 through channel 160 extending from point 149 to the lower section of the cavity 144.

FIG. 16 is a cross sectional view taken along lines 16—16 of FIG. 12 illustrating a lubrication fluid pressure regulator housing 162 containing an aperture 164 for receiving a lubrication fluid regulator assembly, not illustrated. The regulator housing 162 includes an inlet opening 166 connected with the lubrication fluid discharge passage 146 and a return opening 168 for returning lubrication fluid to the interior of the ladder frame 5 from which the return fluid may be dumped into the oil pan connected with the lower surface 112.

Referring now to FIG. 17, a bottom elevational view of the ladder frame is illustrated. A plurality of oil pan connecting bosses 170 are shown containing threaded apertures 172 for receiving oil pan connecting bolts, not illustrated, for attaching an oil pan to the lower surface 112 of the ladder frame 5. Each oil pan connecting boss 170 is spaced from the center of a corresponding strengthening pillar by a distance "d" substantially less than one half the distance between each strengthening pillar. By this arrangement, the mass of each oil pan connecting boss 170 is moved away from the center of the panel portions of the respective side walls extending between each succeeding pair of strengthening pillars 120. Since struts 150 tend to create vibrational nodes along the length of each ladder frame side wall, the natural frequency of the ladder frame means is increased by positioning the respective oil pan connecting bosses 170 adjacent such vibrational nodes rather than in a position intermediate the vibrational nodes.

Figure 19:
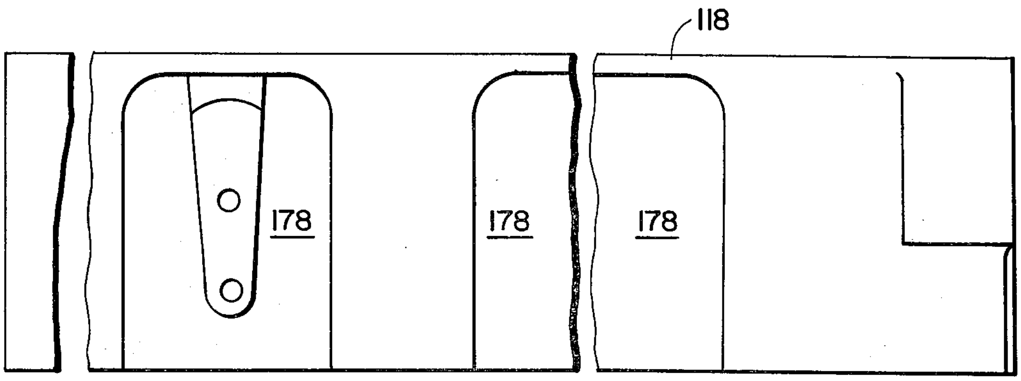
FIG. 19 is a broken elevational view of the left side of the ladder frame illustrated in FIG. 10.
Figure 18A:
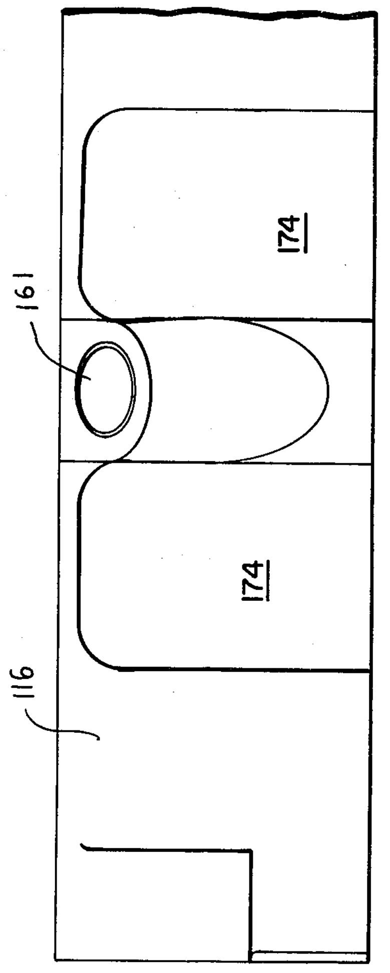
FIG. 18A is an elevational view of one portion of the right side of the ladder frame illustrated in FIG. 10.
Figure 18B:
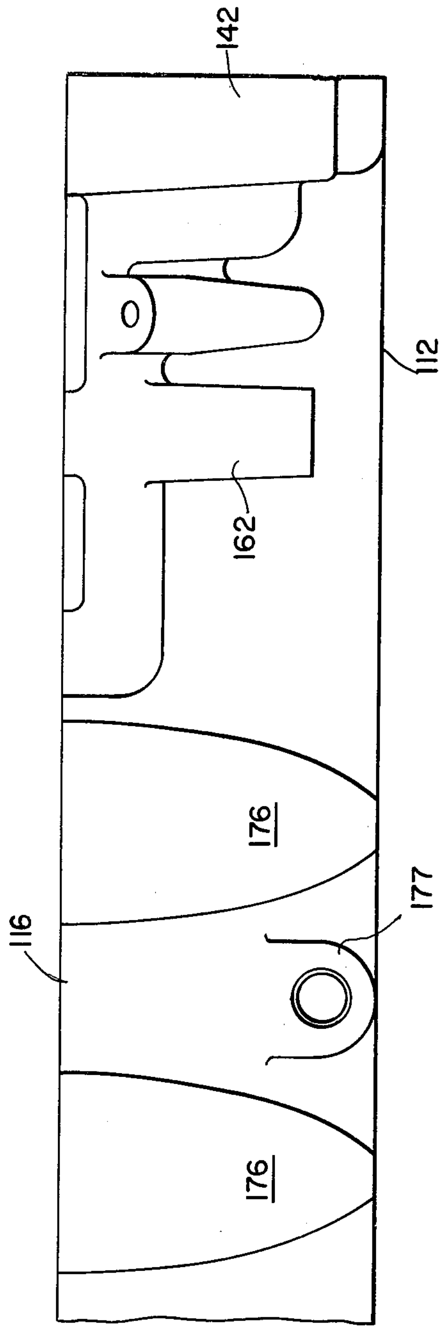
FIG. 18B is an elevational view of the remaining portion of the right side of the ladder frame illustrated in FIG. 10.

Reference is now made to FIGS. 18A, 18B and 19 which disclose, respectively, elevational views of the left side wall 116 and right side wall 118 of the ladder frame as illustrated in FIG. 10. In particular, FIG. 18A discloses oil fill opening 161 positioned between a pair of ladder frame concavities 174 in side wall 116. Similar ladder frame concavities 176 are also formed in side wall 116 as illustrated in FIG. 18B. However, concavities 176 are tapered to permit the oil filter assembly (not illustrated) to be mounted along side wall 116 and to accommodate apertured flat 177. The ladder frame concavities 174 and 176 register with the rigidifying base frames formed by corresponding pairs of strengthening pillars 120 and interconnecting struts 150 as illustrated in FIG. 17.

FIG. 19 similarly discloses a plurality of ladder frame concavities 118 formed in right side wall 118. These ladder frame concavities perform the same functions as cavities 174 and 176 by tending to increase the natural frequency of the ladder frame 5 in the same manner as the main frame concavities 124 illustrated in FIGS. 6 and 8.

INDUSTRIAL APPLICABILITY

A composite engine block structure has thus been disclosed having extremely light weight, high strength characteristics and operational noise reducing capability. The high strength, yet light weight and compact size, of the composite engine block structure makes the subject design ideal for compression ignition engines of the type generally employed in over-the-road vehicles. The light weight of the subject design, of course, improves the overall fuel efficiency of any vehicle equipped with an engine employing the disclosed composite engine block design. The light weight, low noise characteristics and the compact size also make the disclosed engine block design ideal for other applications such as portable compression units, marine propulsion systems and other types of industrial applications in which portability and/or low noise operated characteristics are desired.

What is claimed is:

1. An engine block having plural cylinders for receiving a plurality of piston guiding cylinder liners, comprising (a) a main frame having a head engaging surface on one side and a crankshaft receiving cavity on an opposed side and containing a plurality of closely spaced cylinder cavities for receiving the cylinder liners, said cylinder cavities extending from the head engaging surface toward the crankshaft receiving cavity;

(b) liner engaging means formed in said main frame for engaging each cylinder liner intermediate the liner ends to retain the liner in a position in which each liner is free of all direct contact with said main frame along a substantial portion of the axial length of the liner commencing at the end of the liner adjacent the crankshaft receiving cavity of said main frame thereby defining a plurality of inter liner spaces including those portions of said main frame which separate the liners when positioned within said cylinder cavities, said liner engaging means including a projection in each said cavity directed radially inwardly of each cylinder cavity; and (c) lubrication flow passage forming means for directing lubrication fluid through said main frame along a lubrication flow path which bypasses entirely the portion of said inter liner spaces extending between said head engaging surface and said projections and which specifically includes the portion of said inter liner spaces extending between said projection and said crankshaft receving cavity.

2. An engine block as defined in claim 1, further including coolant passage forming means for directing cooling fluid through said main frame along a coolant path shaped to bring the coolant flow into direct contact with the cylinder liners only along a portion of the axial length of the liners extending between said projections and said head engaging surface of said main frame.

3. An engine block as defined in claim 2, wherein said main frame includes a plurality of head bolt bosses containing threaded holes opening into said head engaging surface for receiving head bolts for attaching a head to said head engaging surface, a plurality of crankshaft bearing supports positioned within said crankshaft receiving cavity, each said bearing support including a pair of cap screw bosses containing threaded holes for receiving cap bolts for attaching a bearing cap to each said bearing support thereby to retain a crankshaft bearing, said main frame further including a plurality of pillars extending generally between said head engaging surface and said crankshaft receiving cavity, each said pillar being connected at one end to one said head bolt boss and at the other end to one said cap screw boss, each said cap screw boss being connected with one said pillar.

4. An engine block as defined in claim 3, wherein the engine block is formed of cast metal and wherein said pillars are shaped to provide flow passages for molten metal during the casting operation.

5. An engine block as defined in claim 3, wherein the interconnected pairs of cap screw bosses, pillars and head bolt bosses associated with each said bearing support are positioned such that the central axis of said interconnected cap screw bosses, pillars and head bolt bosses reside in a single cross plane, all said cross planes being parallel to one another and being interleaved with said cylinder cavities.

6. An engine block as defined in claim 5, wherein said main frame includes a head wall interconnecting all said head bolt bosses, the outer surface of said head wall forming said head engaging surface, and wherein each said cross frame includes a cross wall connected to said head wall and connected to said head bolt bosses, said pillars, said cap screw bosses and said bearing support associated with said cross frame, said cross wall having a thickness which is substantially less than the cross sectional diameters of said bosses and said pillars to which said cross wall is connected.

7. An engine block as defined in claim 6, wherein each said cylinder cavity is shaped to receive a liner having an external stop found intermediate its ends, and wherein said liner engaging means within each cylinder cavity is connected with said cross walls of said pair of cross frames associated with each said cylinder cavity said liner engaging means including a support wall interconnected with said pillars and positioned in parallel spaced relation to said head wall, said support wall including a plurality of circular apertures concentrically arranged around the central axis of said cylinder cavities, respectively, each said circular aperture having a diameter slightly greater than the diameter of the inner portion of a cylinder liner but less than the diameter of the outermost radial portion of each liner stop, each said circular aperture being counterbored to receive the external line stops.

8. An engine block as defined in claim 7, wherein the portion of each said cross wall extending between said head wall and said support wall forms a portion of said coolant path.

9. An engine block as defined in claim 8, wherein each said cross wall portion forming a portion of said coolant path is free of all voids which would allow passage of cooling fluid therethrough.

10. An engine block as defined in claim 9, wherein the portion of each said cross wall extending between said support wall and said bearing support contains a rounded aperture extending between said support wall and said bearing support contains a rounded aperture extending substantially entirely over the distance between said pair of pillars to which said support wall is connected, said aperture being shaped to form upper support webs between said support wall and said pillars to which said cross wall is connected and to form a lower support web connected with said pillars, said cap screw bosses and said bearing support to which said cross wall is connected.

11. An engine block as defined in claim 7, wherein said main frame includes an outer side wall extending generally perpendicularly between said head wall and said support wall along one side of said main frame and further includes an inner side wall extending generally perpendicularly between said head wall and said support wall in parallel spaced relationship to said outer side wall, said outer side wall and said inner side wall being positioned on opposed sides of said cylinder cavities, said cross wall of each said cross frame being extended to intersect with said inner and outer side walls to form a coolant flow chamber around that portion of each cylinder liner extending between said head wall and said support wall.

12. An engine block as defined in claim 11, wherein said outer side wall includes at least one inlet port for each said coolant flow chamber through which coolant fluid may be introduced into said coolant flow chambers, said inlet ports being located adjacent the intersection of said outer side wall and said support wall, and wherein said head wall contains at least one outlet port communicating with each said coolant flow chamber through which coolant fluid may pass out of said coolant flow chambers into the engine head, said outlet ports being located adjacent the intersection of said head wall and said inner side wall to cause coolant fluid to flow generally along a path having a directional component oriented from said outer side wall toward said inner side wall and a directional component oriented from said support wall toward said head wall.

13. An engine block as defined in claim 12, wherein said head wall includes a plurality of discharge ports for receiving the coolant fluid provided to the engine head by said outlet ports of said coolant flow chambers and for discharging the coolant fluid on the exterior side of said outer side wall, said discharge ports causing the coolant fluid to have a directional component oriented from said head wall toward said support wall, said discharge ports being located adjacent the intersection of said head wall and said outer side wall.

14. An engine block as defined in claim 13, further including inlet coolant passage forming means for providing coolant fluid to said inlet ports, said inlet coolant passage forming means including an inlet channel formed on the exterior side of said outer side wall, said inlet channel extending generally parallel to and adjacent the intersection of said outer side wall and said support wall, and outlet coolant passage forming means for receiving coolant fluid discharged from said discharge ports, said outlet coolant passage forming means including an outlet channel formed on the exterior side of said outer side wall, said outlet channel extending generally parallel to said inlet channel adjacent the intersection of said head wall and said outer side wall.

15. An engine block as defined in claim 14, further including a jacket means for forming an inlet coolant manifold including said inlet channel and an outlet coolant manifold including said outlet channel, said jacket means including a single integral member for covering said inlet and outlet channels.

16. An engine block as defined in claim 7, wherein said main frame includes an outer side wall extending generally perpendicularly between said head wall and said support wall along one side of said main frame and further includes an inner side wall extending generally perpendicularly between said head wall and said support wall in parallel spaced relationship to said outer wall in parallel spaced relationship to said outer side wall, said cylinder cavities being disposed between said inner side wall and said outer side wall and further wherein said main frame includes an auxiliary side wall positioned on the side of said inner side wall opposite said cylinder cavities, said auxiliary said wall being spaced from said inner side wall to define a cam shaft receiving cavity, and further wherein said main frame includes a plurality of spacing webs separating said inner side wall and said auxiliary side wall, said spacing webs being positioned generally within extensions of the cross planes, respectively, defined by said cross frames, each said spacing web containing an aperture defining a cam shaft bearing support for supporting a cam shaft for rotation about an axis parallel to the rotational axis of a crankshaft supported by said crankshaft bearing supports, and wherein said lubrication flow passage forming means further includes a linear supply passage formed in a supply rifle having a central axis generally parallel to and intermediate the rotational axes of the cam shaft and crankshaft and a plurality of linear supply branches associated with and residing within each cross plane, respectively, each said supply branch extending between said associated cam shaft bearing support and said crankshaft bearing support and intersecting with said linear supply passage whereby lubricating fluid supplied to each said supply branch by said linear supply passage will travel in opposed directions to the associated cam shaft bearing support and to said crankshaft bearing support, respectively.

17. An engine block as defined in claim 16, wherein said main frame includes a main lubricating fluid supply port for receiving lubricating fluid under pressure, said main lubricating fluid supply port being positioned on said outer side wall of said main frame, and wherein said lubrication flow passage forming means includes a cross flow passage connecting said main lubricating fluid supply port with said linear supply passage for supplying lubricating fluid to said linear supply passage.

18. An engine block as defined in claim 16, wherein said supply rifle is positioned generally within a plane defined by said inner side wall, said inner side wall being extended to intersect with said supply rifle, said inner side wall containing a plurality of openings for forming a return path for lubricating fluid from said cam shaft cavity to said crankshaft cavity through the portion of said inter liner spaces extending between said support wall and said crankshaft receiving cavity.

19. An engine block as defined in claim 18, wherein said auxiliary side wall extends from the side of said main frame defined by said head engaging surface generally inwardly toward and intersecting with said supply rifle, said auxiliary side wall being flared generally outwardly in a direction from said supply rifle toward the side of said main frame at which said crankshaft bearing supports are located, whereby said auxiliary side wall forms a generally V-shape in cross section.

20. An engine block as defined in claim 19, wherein said outer side wall extends perpendicularly from said head wall for a distance approximately equal to the spacing of said supply rifle from said head wall, said outer side wall being flared outwardly toward the side of said main frame at which said crankshaft bearing supports are located at approximately the same angle as the flared portion of said auxiliary side wall.

21. An engine block as defined in claim 20, wherein said main frame includes a plurality of interconnecting webs extending from opposite sides of each said crankshaft bearing support toward and interconnecting with said outer side wall and said auxiliary side wall, respectively, said cross wall of each said cross frame including portions extending between said pillars, said cap screw bosses, said interconnecting webs and said auxiliary and outer side walls.

22. A light weight, high strength composite internal combustion engine block designed for receiving a plurality of cylinder liners, comprising (a) a main frame having a head engaging surface on one side and a crankshaft receiving cavity on an opposed side and containing a plurality of closely spaced cylinder cavities for receiving the cylinder liners, each cylinder cavity extending from the head engaging surface toward the crankshaft receiving cavity, said main frame including (1) liner engaging means for engaging each cylinder liner intermediate the ends of the liner to retain the liner in a predetermined position thereby defining a plurality of inter liner spaces including the portions of said main frame which separate the liners when the liners are positioned within said cylinder cavities, (2) a plurality of head bolt bosses containing threaded holes opening into said head engaging surface for receiving head bolts for attaching an engine head to said head engaging surface, (3) a plurality of crankshaft bearing supports positioned within said crankshaft receiving cavity, each said bearing support including a pair of cap screw bosses containing threaded holes for receiving cap bolts for attaching a bearing cap to each said bearing support thereby to retain a crankshaft bearing, and (4) a plurality of parallel cross frames interleaved with said cylinder cavities, each said cross frame including at least one head bolt boss and at least one cap screw boss; and (b) ladder frame means connected with said main frame for strengthening said main frame by providing support to said cross frames and for forming an extension of said crankshaft receiving cavity of said main frame to substantially encompass the space within the composite engine block within which the cranks of the crankshaft are mounted for rotational movement.

23. An engine block as defined in claim 22, wherein said cross frame includes a pair of connecting pillars extending generally between said head engaging surface and said crankshaft receiving cavity, each said connecting pillar being connected at one end to one said head bolt boss and at the other end to one said cap screw boss.

24. An engine block as defined in claim 23, wherein said main frame is formed of cast metal and wherein said pillars are shaped to provide flow passages for molten metal during the casting operation.

25. An engine block as defined in claim 23, wherein said main frame includes (a) a head wall interconnecting all said head bolt bosses, the outer surface of said head wall forming said head engaging surface, (b) an outer side wall extending generally perpendicularly to said head wall along one side of said main frame, (c) an inner side wall extending generally perpendicularly to said head wall and in parallel spaced relationship to said outer side wall, said cylinder cavities being disposed between said inner and outer side walls, said inner side wall extending from said head engaging surface to said crankshaft receiving cavity, and (d) an auxiliary side wall which extends from said inner side wall toward the side of said main frame opposite said head wall.

26. An engine block as defined in claim 25, wherein said ladder frame means includes (a) a first side wall forming an extension of said outer side wall of said main frame, (b) a second side wall forming an extension of said auxiliary side wall of said main frame, (c) a main frame engaging surface and an oil pan engaging surface, said surfaces being generally parallel and spaced from one another by said first and second side walls which are arranged generally perpendicularly to said surfaces, (d) a plurality of pairs of strengthening pillars extending between said main frame engaging surface and said oil pan engaging surface, each said pair of strengthening pillars being positioned to coincide with the plane of one of said cross frames of said main frame, one strengthening pillar of each said pair being integrally connected with the inside surface of said first side wall and the other said strengthening pillar of each said pair being integrally connected with the inside surface of said second side wall.

27. An engine block as defined in claim 26, wherein said ladder frame means includes a plurality of struts located on the said oil pan engaging side of said ladder frame means, each said strut being connected at one end to one strengthening pillar of a pair of strengthening pillars and at the other end to the other said strengthening pillar of said pair of strengthening pillars.

28. An engine block as defined in claim 27, wherein said ladder frame means includes a plurality of strengthening webs located on said oil pan engaging side of said ladder frame means, each said strengthening web being connected at the intersection of a strengthening pillar and a side wall of said ladder frame means.

29. An engine block as defined in claim 27, wherein said main frame includes a pair of interconnecting webs extending in opposite directions from each said crankshaft bearing support toward and interconnecting with said outer side wall and said auxiliary side wall, respectively, each said interconnecting web including a connecting bolt boss containing a threaded hole for receiving a connecting bolt for attaching said ladder frame means to said main frame, and wherein each said strengthening pillar contains a bolt hole aligned to register with said threaded apertures in said connecting bolt bosses, whereby each said pair of strengthening pillars and said connected strut forms a rigidifying base frame for the corresponding rigidifying frame of said main frame when said base frame is attached by connecting bolts to said corresponding rigidifying frame.

30. An engine block as defined in claim 29, further including vibration reducing means for reducing the intensity of vibration caused by operation of an engine formed from said main frame and said ladder frame means by increasing the natural frequency of the engine block, said vibration reduction means including a plurality of main frame concavities formed in said outer side wall and said auxiliary side wall in registry with said rigidifying frames and including a plurality of ladder frame concavities formed in said first and second side walls in registry with said rigidifying base frames.

31. An engine block as defined in claim 27, wherein said ladder frame means includes a lubrication fluid pump housing formed integrally in said first side wall, and wherein said outer side wall includes a lubrication fluid entry passage opening at one end adjacent the connection of said main frame and said ladder frame means, said ladder frame means includes a lubrication fluid discharge passage extending from said integral lubrication pump housing to said lubrication fluid entry passage of said outer side wall for delivering lubrication fluid to said main frame.

32. An engine block as defined in claim 31, wherein said main frame engaging surface of said ladder frame forms the top surface of said ladder frame when in use and wherein said ladder frame means includes a lubrication fluid intake passage extending from said oil pan engaging surface of said lubrication fluid pump housing, said lubrication fluid intake passage opening into the interior of said lubrication fluid pump housing at a point substantially above the lowest point in said housing to permit lubrication fluid to be trapped within said lubrication fluid housing when the lubrication fluid pump is not operating.

33. An engine block as defined in claim 28, wherein said ladder frame means includes a lubrication fluid pressure regulator housing integrally formed in said first side wall, said pressure regulator housing including an inlet opening connected with said lubrication fluid discharge passage and a return opening for returning lubrication fluid to the interior of said ladder frame.

34. An engine block as defined in claim 32, wherein said main frame includes (a) liner engaging means for engaging each cylinder liner intermediate the cylinder liner ends to retain the liners in a position in which each liner is free of all direct contact with said main frame along a substantial portion of the axial length of the liner commencing at the end of the liner adjacent the crankshaft receiving cavity of said main frame, said liner engaging means including a projection in each said cavity directed radially inwardly of each cylinder cavity;

(b) coolant passage forming means for directing cooling fluid through said main frame along a coolant path shaped to bring the coolant flow into direct contact with the cylinder liners only along a portion of the axial length of the liners extending between said projections and said head engaging surface of said main frame; and (c) lubrication flow passage forming means for directing lubrication fluid through said main frame along a lubrication flow path which by-passes entirely the portion of said inter liner spaces extending between said head engaging surface and said projections and which specifically includes the portions of said inter liner spaces extending between said projections and said crankshaft receiving cavity.

35. An engine block as defined in claim 34, wherein each said cross frame includes a cross wall connected to said head wall and connected to said head bolt bosses, said pillars, said cap screw bosses and said bearing support associated with said cross frame, said cross wall having a thickness which is substantially less than the cross sectional diameters of said bosses and said pillars to which said cross wall is connected.

36. An engine block as defined in claim 35, wherein said liner engaging means within each cylinder cavity is connected with said cross walls of said pair of cross frames associated with each said cylinder cavity, said liner engaging means including a support wall interconnected with said pillars and positioned in parallel spaced relation to said head wall, said support wall including a plurality of a circular apertures concentrically arranged around the central axis of said cylinder cavities, respectively, each said circular aperture having a diameter slightly greater than the diameter of the outer portion of a cylinder liner but less than the diameter of an external stop formed on the liner, said circular aperture being counterbored to receive the external liner stop.

37. An engine block as defined in claim 36, wherein the portion of each said cross wall extending between said head wall and said support wall forms a portion of said coolant path.

38. An engine block as defined in claim 37, wherein each said cross wall portion forming a portion of said coolant path is free of all voids which would allow passage of cooling fluid therethrough.

39. An engine block as defined in claim 38, wherein the portion of each said cross wall extending between said support wall and said bearing support contains a rounded aperture extending substantially entirely over the distance between said pair of pillars to which said support wall is connected, said aperture being shaped to form upper support webs between said support wall and said pillars to which said cross wall is connected and to form a lower support web connected with said pillars, said cap screw bosses and said bearing support to which said cross wall is connected.

40. An engine block as defined in claim 39, wherein said cross wall of each said cross frame is extended to intersect with said inner and outer side walls to form a coolant flow chamber around that portion of the associated cylinder liner extending between said head wall and said support wall.

41. An engine block as defined in claim 40, wherein said outer side wall includes at least one inlet port for each said coolant flow chamber through which coolant fluid may be introduced into the associated said coolant flow chamber, said inlet ports being located adjacent the intersection of said outer side wall and said support wall, and wherein said head wall contains at least one outlet port communicating with each said coolant flow chamber through which coolant fluid may pass out of the associated said coolant flow chamber into the engine head, said outlet ports being located adjacent the intersection of said head wall and said inner side wall to cause coolant fluid to flow generally along a path having a directional component oriented from said outer side wall toward said inner side wall and a directional component oriented from said support wall toward said head wall.

42. An engine block as defined in claim 41, wherein said head wall includes a plurality of discharge ports of receiving the coolant fluid provided to the engine head by said outlet ports of said coolant flow chambers, and for discharging the coolant fluid on the exterior side of said outer side wall, said discharge ports causing the coolant fluid to have a directional component oriented from said head wall toward said support wall, said discharge ports being located adjacent the intersection of said head wall and said outer side wall.

43. An engine block as defined in claim 42, further including inlet coolant passage forming means for providing coolant fluid to said inlet ports, said inlet coolant passage forming means including an inlet channel formed on the exterior side of said outer side wall, said inlet channel extending generally parallel to and adjacent the intersection of said outer side wall and said support wall, and outlet coolant passage forming means for receiving coolant fluid discharged from said discharge ports, said outlet coolant passage forming means including an outlet channel formed on the exterior side of said outer side wall, said outlet channel extending generally parallel to said inlet channel adjacent the intersection of said head wall and said outer side wall.

44. An engine block as defined in claim 43, further including a jacket means for forming an inlet coolant manifold including said inlet channel and an outlet coolant manifold including said outlet channel, said jacket means including a single integral member for covering said inlet and outlet channels.

45. An engine block as defined in claim 32, wherein said auxiliary side wall is spaced from said inner side wall to define a cam shaft receiving cavity, and further wherein said main frame includes a plurality of spacing webs separating said inner side wall and said auxiliary side wall, said spacing webs being positioned generally within extensions of the cross planes defined by said cross frames, respectively, each said web containing an aperture defining a cam shaft bearing support for supporting a cam shaft for rotation about an axis parallel to the rotational axis of a crankshaft when supported by said crank shaft bearing supports, and wherein said lubrication flow passage forming means further includes a linear supply passage formed in a supply rifle having a central axis generally parallel to and intermediate the rotational axis of the cam and crankshafts and a plurality of linear supply branches associated with and residing within each cross plane, respectively, each said supply branch extending between said associated cam shaft bearing support and said crankshaft bearing support and intersecting with said linear supply passage, whereby lubrication fluid supplied to each said supply branch by said linear supply passage will travel in opposed directions to the associated cam shaft bearing support and to said crankshaft bearing support, respectively.

46. An engine block as defined in claim 45, wherein said main frame includes a main lubricating fluid supply port for receiving lubricating fluid under pressure, said main lubricating fluid supply port being positioned on said outer side wall side of said main frame, and wherein said lubrication flow passage forming means includes a cross flow passage connecting said main lubricating fluid supply port with said linear supply passage for supplying lubricating fluid to said linear supply passage.

47. An engine block as defined in claim 46, wherein said supply rifle is positioned generally within a plane defined by said inner side wall, said inner side wall being extended to intersect with said supply rifle, said inner side wall containing a plurality of openings for forming a lubricating fluid return path extending from said cam shaft cavity to said crankshaft cavity through the portion of said inter liner spaces extending between said support wall and said crankshaft receiving cavity.

48. An engine block as defined in claim 47, wherein said auxiliary side wall extends from the side of said main frame defined by said head engaging surface generally inwardly toward and intersection with said supply rifle, said auxiliary side wall being flared generally outwardly in a direction from said supply rifle toward the side of said main frame at which said crankshaft bearing supports are located whereby said auxiliary side wall forms a generally V-shape in cross section.

49. An engine block as defined in claim 48, wherein said outer side wall is extended in a plane from said head wall for a distance approximately equal to the distance of said main rifle from said head wall, said outer side wall being flared outwardly toward the side of said main frame at which said crankshaft bearing supports are located at approximately the same angle as the flared portion of said auxiliary side wall.

50. An engine block as defined in claim 46, wherein said outer side wall includes lubrication filter mounting means for mounting a lubrication fluid filter in a position to receive lubrication fluid from said lubrication fluid entry passage and providing said fluid to said main lubricating fluid supply port.

51. A ladder frame for connecting the oil pan of an engine to the main frame of an engine block having a plural of cylinder cavities interleaved with a plurality of cross frames extending between a head engaging surface and an opposed base surface comprising:

(a) a hollow skirt member having an upper surface for engaging the main frame and a lower surface for engaging the oil pan, said hollow skirt member including first and second side walls extending between said upper and lower surfaces in a generally spaced parallel relationship in one another;

(b) a plurality of pairs of strengthening pillars extending between said upper and lower surfaces, each said pair of strengthening pillars being positioned to coincide with the plane of one of the main frame cross frames, one strengthening pillar of each said pair being integrally connected with the inside surface of said first side wall and the other said strengthening pillar of each said pair being integrally connected with the inside surface of said second side wall; and (c) a plurality of struts located adjacent said lower surface of said hollow skirt member, each said strut being connected at one end to said one strengthening pillar of a pair of strengthening pillars and at the other end to the other said strengthening pillar of said pair of strengthening pillars, whereby each said pair of strengthening pillars and said connected strut form a rigidifying base frame for corresponding rigidifying frame of the main frame.

52. A ladder frame as defined in claim 51, wherein said hollow skirt member includes a plurality of strengthening webs located on its lower side, each said strengthening web being connected at the intersection of a strengthening pillar and a side wall of said ladder frame means.

53. A ladder frame as defined in claim 52, wherein each said strengthening pillar contains a bolt hole positioned to register with corresponding threaded apertures in the cross frames of the main frame.

54. A ladder frame as defined in claim 53, further including vibration reducing means for reducing the intensity of vibration caused by operation of an engine by increasing the natural frequency of the engine to which the ladder frame is connected, said vibration reducing means including a plurality of ladder frame concavities formed in said first and second side walls in registry with said rigidifying base frames.

55. A ladder frame as defined in claim 54, wherein said hollow skirt member includes a lubrication fluid pump housing formed integrally in said first side wall and, a lubrication fluid discharge passage extending from said integral lubrication pump housing to said upper surface.

56. A ladder frame as defined in claim 55, wherein said hollow skirt member includes a lubrication fluid intake passage extending from said lower surface to said lubrication fluid housing, said lubrication fluid intake passage opening into the interior of said lubrication fluid pump housing at a point substantially above the lowest point in said housing to permit lubrication fluid to be trapped within said lubrication fluid housing when the lubrication fluid pump is not operating.

57. A ladder frame as defined in claim 56, wherein said hollow skirt member includes a lubrication fluid pressure regulator housing integrally formed in said first side wall, said pressure regulator housing including an inlet opening connected with said lubrication fluid discharge passage and a return opening for returning lubrication fluid to the interior of said hollow skirt member.

58. A ladder frame as defined in claim 54, wherein said side walls include a plurality of oil pan connecting bosses containing threaded apertures for receiving oil pan connecting bolts, said oil pan connecting bosses being formed at spaced points removed from the center of the panel portions of said side walls extending between each succeeding pair of strengthening pillars arranged along each said side wall, thereby the mass in the central section of each said panel portion is maintained as low as possible.

59. An engine block having plural cylinders for receiving a plurality of cylinder liners, comprising (a) a main frame having a head engaging surface on one side and a crankshaft receiving cavity on an opposed side and containing a plurality of closely spaced cylinder cavities for receiving the cylinder liners, said cylinder cavities extending from the head engaging surface toward the crankshaft receiving cavity;

(b) liner engaging means formed in said main frame for engaging each cylinder liner intermediate the liner ends to retain the liner in a position in which each liner is free of all direct contact with said main frame along a substantial portion of the axial length of the liner commencing at the end of the liner adjacent the crankshaft receiving cavity of said main frame thereby defining a plurality of inter liner spaces including those portions of said main frame which separate the liners when positioned within said cylinder cavities, said liner engaging means including a projection in each said cavity directed radially inwardly of each cylinder cavity;

(c) coolant passage forming means for directing cooling fluid through said main frame along a coolant path including a coolant flow chamber around each cylinder liner shaped to bring the coolant flow into direct contact with the cylinder liners only along a portion of the axial length of the liners extending between said projections and said head engaging surface of said main frame, said coolant passage forming means including (1) a plurality of inlet ports on one side of said main frame introducing coolant fluid into each coolant flow chamber, (2) a plurality of outlet ports opening into said head engaging surface for allowing coolant to be transferred from each coolant flow chamber into the engine head, and (3) a plurality of discharge ports opening into said head engaging surface for receiving the coolant fluid returned to said main frame which coolant fluid was provided to the engine head through said outlet ports, said discharge ports being located on the same side of said main frame as inlet ports.

60. An engine block as defined in claim 59, wherein said main frame includes a head wall the outer surface of which forms said head engaging surface, and wherein said liner engaging means includes a support wall containing a plurality of circular apertures concentrically arranged around the central axis of said cylinder cavities, respectively, each said circular aperture having a diameter slightly greater than the diameter of the portion of a cylinder liner which remains free of contact with said main frame, each said circular aperture being counterboard to receive the external liner stops, and wherein said main frame includes an outer side wall extending generally perpendicularly between said head wall and said support wall along one side of said main frame and further includes an inner side wall extending generally perpendicularly between said head wall and said support wall in parallel spaced relationship to said outer side wall, said outer side wall and said inner side wall being positioned on opposed sides of said cylinder cavities, said main frame including a plurality of cross walls extending between said cylinder cavities, respectively, to form the coolant flow chamber around that portion of each cylinder liner extending between said head wall and said support wall.

61. An engine block as defined in claim 60, wherein said outer side wall contains at least one said inlet for each said coolant flow chamber through which coolant fluid may be introduced into the corresponding said coolant flow chamber, said inlet ports being located adjacent the intersection of said outer side wall and said support wall, and wherein said head wall contains at least one said outlet port communicating with each said coolant flow chamber through which coolant fluid may pass out of said coolant flow chambers into the engine head, said outlet ports being located adjacent the intersection of said head wall and said inner side wall to cause coolant fluid to flow generally along a path having a directional component oriented from said outer side wall toward said inner side wall and a directional component oriented from said support wall toward said head wall.

62. An engine block as defined in claim 61, wherein said discharge ports are positioned to cause the coolant fluid to have a directional component from said head wall toward said support wall, said discharge ports being located adjacent the intersection of said head wall and said outer side wall.

63. An engine block as defined in claim 62, further including inlet coolant passage forming means for providing coolant fluid to said inlet ports, said inlet coolant passage forming means including an inlet channel formed on the exterior side of said outer side wall, said inlet channel extending generally parallel to and adjacent the intersection of said outer side wall and said support wall, and outer coolant passage forming means for receiving coolant fluid discharged from said discharge ports, said outlet coolant passage forming means including an outlet channel formed on the exterior side of said outer side wall, said outlet channel extending generally parallel to said inlet channel adjacent the intersection of said head wall and said outer side wall.

64. An engine block as defined in claim 63, further including a jacket means for forming an inlet coolant manifold including said inlet channel and an outlet coolant manifold including said outlet channel, said jacket means including a single integral member for covering said inlet and outlet channels.

* * * * *